(12) United States Patent
York et al.

(10) Patent No.: US 10,516,691 B2
(45) Date of Patent: Dec. 24, 2019

(54) NETWORK BASED INTERVENTION

(71) Applicant: Pearson Education, Inc., New York, NY (US)

(72) Inventors: Sean A. York, San Diego, CA (US); Steven H. Hill, Austin, TX (US)

(73) Assignee: PEARSON EDUCATION, INC., Bloomington, MN (US)

( * ) Notice: Subject to any disclaimer, the term of this patent is extended or adjusted under 35 U.S.C. 154(b) by 141 days.

(21) Appl. No.: 15/337,657

(22) Filed: Oct. 28, 2016

(65) Prior Publication Data

US 2017/0048269 A1  Feb. 16, 2017

Related U.S. Application Data

(63) Continuation-in-part of application No. 14/928,061, filed on Oct. 30, 2015, now Pat. No. 9,928,383, and a continuation-in-part of application No. 14/204,398, filed on Mar. 11, 2014, now Pat. No. 9,483,954.

(60) Provisional application No. 62/072,932, filed on Oct. 30, 2014, provisional application No. 61/778,296, filed on Mar. 12, 2013.

(51) Int. Cl.
| | |
|---|---|
| *G09B 7/00* | (2006.01) |
| *H04L 29/06* | (2006.01) |
| *H04L 29/08* | (2006.01) |
| *G06F 21/62* | (2013.01) |

(52) U.S. Cl.
CPC ...... *H04L 63/1433* (2013.01); *G06F 21/6254* (2013.01); *H04L 63/0421* (2013.01); *H04L 63/107* (2013.01); *H04L 67/10* (2013.01); *H04L 67/306* (2013.01); *G06F 2221/2111* (2013.01)

(58) Field of Classification Search
CPC ... G09B 7/00; G09B 7/02; G09B 7/07; G09B 7/073; G09B 7/077; G06Q 50/01
See application file for complete search history.

(56) References Cited

U.S. PATENT DOCUMENTS

| | | |
|---|---|---|
| 8,504,481 B2 | 8/2013 | Motahari |
| 8,548,503 B2 | 10/2013 | Oh |
| 8,694,646 B1 | 4/2014 | Kothari |
| 8,726,398 B1 | 5/2014 | Tock |
| 8,753,200 B1 | 6/2014 | Supanc et al. |
| 8,972,605 B2 | 3/2015 | Fletcher |

(Continued)

FOREIGN PATENT DOCUMENTS

WO  2009/149262 A1  12/2009

OTHER PUBLICATIONS

International Search Report and Written Opinion dated Feb. 23, 2016, for International Application No. PCT/US2015/058467, 12 pages.

*Primary Examiner* — Peter R Egloff
(74) *Attorney, Agent, or Firm* — Quarles & Brady LLP

(57) ABSTRACT

Methods and systems for network-based intervention are disclosed. The methods can include receiving a user response and analyzing the user response and other user data to determine a user typology. The user typology can be compared with risk data that indicates the user's risk of failing to achieve a target outcome based on the identified user typology. If the user's risk of failing to achieve the target outcome exceeds a desired level, a mitigation plan can be generated and provided to the user to thereby facilitate in the attainment of the target outcome.

17 Claims, 15 Drawing Sheets

(56) References Cited

U.S. PATENT DOCUMENTS

| | | |
|---|---|---|
| 9,076,016 B2 | 7/2015 | Raman |
| 9,231,920 B1 | 1/2016 | Tock |
| 9,292,696 B1 | 3/2016 | Kothari |
| 9,300,637 B1 | 3/2016 | Kothari |
| 9,307,035 B1 | 4/2016 | Berentey |
| 9,323,818 B1 | 4/2016 | Kothari |
| 9,330,145 B2 | 5/2016 | Satyanarayanan |
| 9,338,220 B1 | 5/2016 | Kothari |
| 9,356,993 B1 | 5/2016 | Kothari |
| 9,413,526 B1 | 8/2016 | Kothari |
| 9,432,342 B1 | 8/2016 | Kothari |
| 9,450,956 B1 | 9/2016 | Giobbi |
| 9,483,954 B2 | 11/2016 | York et al. |
| 9,613,227 B1 | 4/2017 | Kothari |
| 9,619,482 B1 | 4/2017 | Kothari |
| 9,654,463 B2 | 5/2017 | Brannon |
| 9,667,741 B1 | 5/2017 | Kothari |
| 9,703,967 B1 | 7/2017 | Kothari |
| 9,720,893 B2 | 8/2017 | Bisaga |
| 9,722,973 B1 | 8/2017 | Kothari |
| 2001/0036224 A1 | 11/2001 | Demello |
| 2002/0142278 A1 | 10/2002 | Whitehurst et al. |
| 2004/0033475 A1* | 2/2004 | Mizuma ............ G06Q 10/06 434/219 |
| 2004/0202991 A1 | 10/2004 | Clark et al. |
| 2006/0070117 A1 | 3/2006 | Spalink |
| 2006/0234201 A1* | 10/2006 | Pierson, III ............ G09B 7/00 434/323 |
| 2007/0220016 A1 | 9/2007 | Estrada |
| 2008/0038705 A1 | 2/2008 | Kerns et al. |
| 2008/0040370 A1 | 2/2008 | Bosworth et al. |
| 2008/0126476 A1 | 5/2008 | Nicholas |
| 2008/0134170 A1* | 6/2008 | Astheimer ............ G09B 5/00 717/175 |
| 2009/0075709 A1 | 3/2009 | Park |
| 2009/0157658 A1 | 6/2009 | Bonev |
| 2009/0182873 A1 | 7/2009 | Spalink |
| 2010/0049803 A1 | 2/2010 | Ogilvie |
| 2010/0070510 A1 | 3/2010 | Agarwal et al. |
| 2010/0159438 A1 | 6/2010 | German et al. |
| 2011/0105077 A1 | 5/2011 | Chandrasekaran |
| 2011/0117534 A1 | 5/2011 | Berger et al. |
| 2011/0125844 A1 | 5/2011 | Collier |
| 2011/0221568 A1 | 9/2011 | Giobbi |
| 2011/0320373 A1 | 12/2011 | Lee |
| 2012/0040326 A1 | 2/2012 | Larson-Rutter et al. |
| 2012/0078653 A1 | 3/2012 | Sachs et al. |
| 2012/0244505 A1 | 9/2012 | Lang et al. |
| 2012/0278329 A1 | 11/2012 | Borggaard |
| 2012/0303635 A1 | 11/2012 | Summers |
| 2012/0317205 A1 | 12/2012 | Lahiani |
| 2013/0040277 A1 | 2/2013 | Linton |
| 2013/0096892 A1* | 4/2013 | Essa ............ G06F 17/18 703/2 |
| 2013/0160138 A1 | 6/2013 | Schultz |
| 2013/0226949 A1 | 8/2013 | Ogilvie |
| 2013/0254889 A1 | 9/2013 | Stuntebeck |
| 2013/0311660 A1 | 11/2013 | Dabbiere |
| 2013/0332987 A1 | 12/2013 | Tenneti |
| 2014/0115715 A1 | 4/2014 | Pasdar |
| 2014/0129628 A1 | 5/2014 | Fletcher |
| 2014/0236916 A1 | 8/2014 | Barrington |
| 2014/0272911 A1 | 9/2014 | York et al. |
| 2014/0295957 A1 | 10/2014 | Supanc et al. |
| 2014/0297765 A1 | 10/2014 | Beckley |
| 2014/0308650 A1 | 10/2014 | Loring et al. |
| 2015/0128287 A1 | 5/2015 | LaFever |
| 2015/0200915 A1 | 7/2015 | Yeager |
| 2015/0242638 A1 | 8/2015 | Bitran |
| 2015/0244681 A1 | 8/2015 | Blumenfeld |
| 2015/0346937 A1 | 12/2015 | Mahmoudian-Bidgoly |
| 2016/0021039 A1 | 1/2016 | Woo |
| 2016/0042198 A1 | 2/2016 | Kapoor |
| 2016/0050525 A1 | 2/2016 | Droll |
| 2016/0057148 A1 | 2/2016 | Micucci |
| 2016/0065610 A1 | 3/2016 | Peteroy |
| 2016/0078120 A1 | 3/2016 | Pradeep |
| 2016/0078191 A1 | 3/2016 | Casimiro |
| 2016/0078350 A1 | 3/2016 | Yarvis |
| 2016/0080403 A1 | 3/2016 | Cunningham |
| 2016/0094476 A1 | 3/2016 | Dronen |
| 2016/0094883 A1 | 3/2016 | Tidwell |
| 2016/0124614 A1 | 5/2016 | Bromberg |
| 2016/0124999 A1 | 5/2016 | Gonzalez Brenes |
| 2016/0125200 A1 | 5/2016 | York et al. |
| 2016/0127248 A1 | 5/2016 | Gonzalez Brenes |
| 2016/0203349 A1 | 7/2016 | Giobbi |
| 2016/0321100 A1 | 11/2016 | Jones |
| 2017/0041315 A1 | 2/2017 | Giobbi |
| 2017/0048269 A1 | 2/2017 | York |
| 2017/0126700 A1 | 5/2017 | Hurst |
| 2017/0163429 A1 | 6/2017 | Stuntebeck |

* cited by examiner

NETWORK BASED INTERVENTION

CROSS-REFERENCES TO RELATED APPLICATIONS

This application is a Continuation-in-Part of U.S. application Ser. No. 14/928,061, filed on Oct. 30, 2015, and entitled "METHODS AND SYSTEMS FOR NETWORK-BASED ANALYSIS, INTERVENTION, AND ANONYMIZATION", which claims the benefit of U.S. Provisional Application No. 62/072,932, Filed Oct. 30, 2014; and this application is a Continuation-in-Part of U.S. application Ser. No. 14/204,398, filed Mar. 11, 2014, and entitled "EDUCATIONAL NETWORK BASED INTERVENTION", which claims the benefit of U.S. Provisional Application No. 61/778,296, filed on Mar. 12, 2013; the entirety of each of which is hereby incorporated by reference herein.

BACKGROUND OF THE INVENTION

This application relates to the field data transmission and network optimization.

A computer network or data network is a telecommunications network which allows computers to exchange data. In computer networks, networked computing devices exchange data with each other along network links (data connections). The connections between nodes are established using either cable media or wireless media. The best-known computer network is the Internet.

Network computer devices that originate, route and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology and organizational intent. In most cases, communications protocols are layered on (i.e. work using) other more specific or more general communications protocols, except for the physical layer that directly deals with the transmission media.

As the volume of data exchanged between nodes in computer networks has increased, the speed of data transmission has become increasingly more important. Although current technologies provide improved speeds as compared to their predecessors, further developments are needed.

BRIEF SUMMARY OF THE INVENTION

One aspect of the present disclosure relates to a system for alerting a user device based on a proposed anonymization of a contribution to a conversation thread via one or several location-based anonymization rules. The system includes a user device including: location determining-features that can determine a physical location of the user device; a network interface that can exchange data with a server via a communication network; and an I/O subsystem that can convert electrical signals to user-interpretable outputs in a user interface. The system can include a server that can: receive a contribution from the user device, which contribution includes content for placement in a conversation thread; and determine an anonymization level for applying to the contribution. In some embodiments, determining the anonymization level includes: receiving physical location information from the user device, which physical location information identifies the physical location of the user device; retrieving an anonymization table from a content access database; and extracting level data from the anonymization table based on the physical location information of the user device, which level data includes the anonymization level. The server can: identify a potential identifier in the content of the contribution; anonymize the potential identifier according to the determined anonymization level; and generate and provide an alert to the user device, which alert includes code to direct the user device to provide an indicator of the received alert via the I/O subsystem.

In some embodiments, the indicator of the received alert includes: an aural indicator; a tactile indicator; and a visual indicator. In some embodiments, the contribution includes contribution data identifying the originator of the contribution. In some embodiments, the server can determine an active location of the originator of the contribution, which active location is based on the physical location and a membership of the user. In some embodiments, extracting level data from the anonymization table is based on the physical location information of the user device and the active location of the user.

In some embodiments, the server can retrieve anonymization rules corresponding to the anonymization level. In some embodiments, the location-determining features include a Global Positioning System receiver and a Global Positioning System antenna. In some embodiments, the server can identify the potential identifier as an actual identifier when the potential identifier matches user data and when the potential identifier does not match group materials. In some embodiments, the server can identify the potential identifier as not an actual identifier when the potential identifier does not match user data. In some embodiments, the server can identify the potential identifier as not an actual identifier when the potential identifier matches user data, when the potential identifier matches group materials, and when the potential identifier is associated with the group materials. In some embodiments, identifying the potential identifier as not an actual identifier when the potential identifier matches user data, when the potential identifier matches group materials, and when the potential identifier is associated with the group materials includes: identifying a window size for evaluation, which window size specifies an amount of data surrounding the potential identifier for analysis; identifying data within the window; analyzing the data within the window; and outputting an indicator of association between the potential identifier and the group materials.

One aspect of the present disclosure relates to a method for alerting a user device based on a proposed anonymization of a contribution to a conversation thread via one or several location-based anonymization rules. The method includes: receiving at a server a contribution from a user device via a communication network, which contribution includes content for placement in a conversation thread; and determining with the server an anonymization level for applying to the contribution. In some embodiments, determining the anonymization level includes: receiving physical location information from the user device, which physical location information identifies a physical location of the user device; retrieving an anonymization table from a content access database; and extracting level data from the anonymization table based on the physical location information of the user device, which level data includes the anonymization level. In some embodiments, the method includes identifying with the server a potential identifier in the content of the contribution; anonymizing with the server the potential identifier according to the determined anonymization level; and generating and providing an alert to the user device via the communication network. In some embodiments, the alert includes code to direct the user device to provide an indicator of the received alert via an I/O subsystem configured to convert electrical signals to user-interpretable outputs in a user interface.

In some embodiments, the indicator of the received alert includes: an aural indicator; a tactile indicator; and a visual indicator. In some embodiments, the contribution includes contribution data identifying the originator of the contribution. In some embodiments the method includes determining an active location of the originator of the contribution, which active location is based on the physical location and a membership of the user. In some embodiments, extracting level data from the anonymization table is based on the physical location information of the user device and the active location of the user.

In some embodiments, the method includes retrieving anonymization rules corresponding to the anonymization level. In some embodiments, the location information is generated by location-determining features of the user device. In some embodiments, the location-determining features include a Global Positioning System receiver and a Global Positioning System antenna. In some embodiments, the method includes identifying the potential identifier as an actual identifier when the potential identifier matches user data and when the potential identifier does not match group materials.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
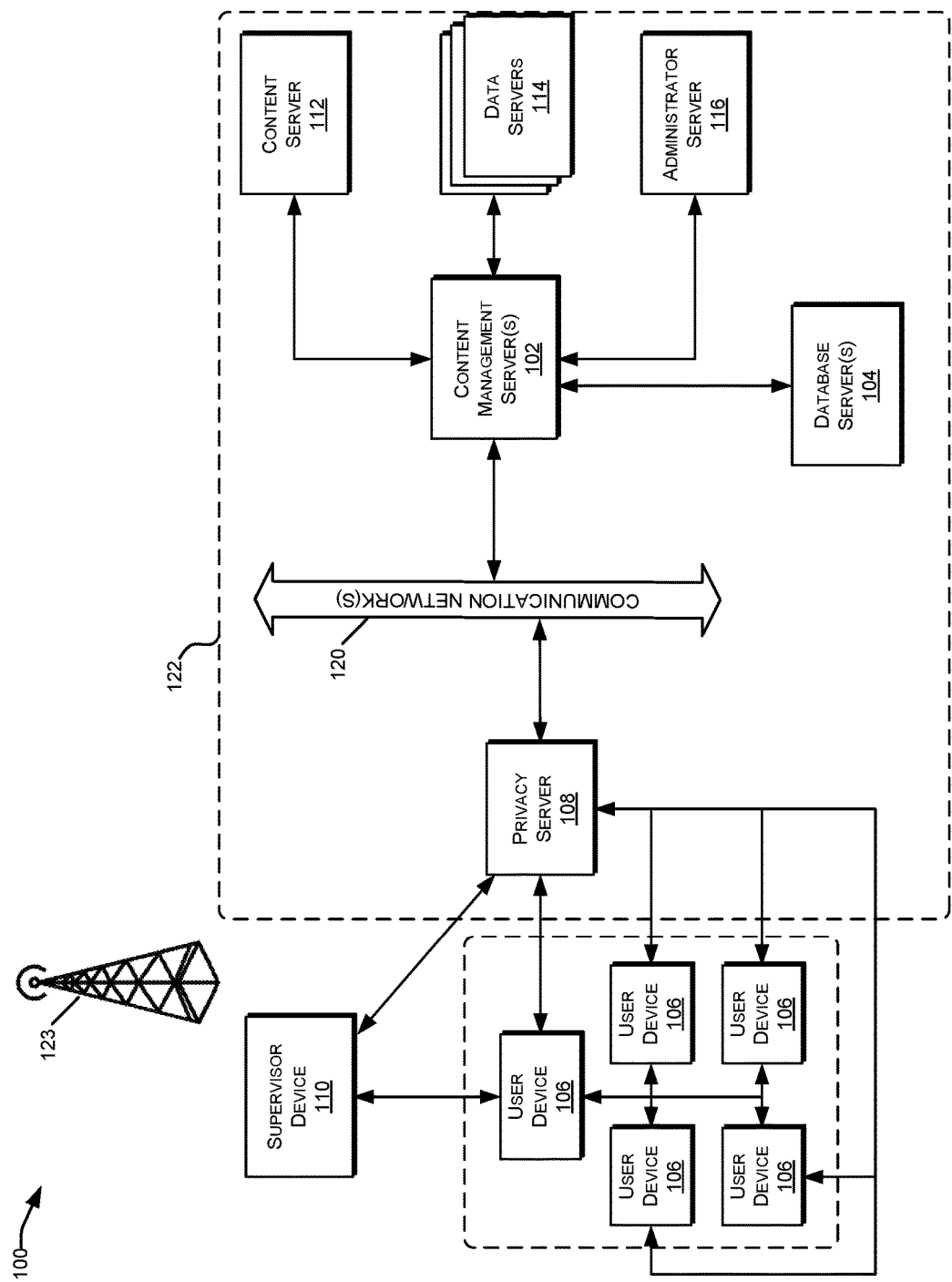
FIG. 1 is a block diagram showing illustrating an example of a content distribution network.

With reference now to FIG. 1, a block diagram is shown illustrating various components of a network-based intervention system 100, also referred to herein as a content delivery network 100, which implements and supports certain embodiments and features described herein. The content delivery network 100 collects, receives, and stores data for one or several users of the system. In some embodiments, for example, the content delivery network 100 can determine whether an intervention is desired based on the likelihood that a user will achieve a target outcome.

The content delivery network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content delivery network 100 may include one or more databases servers 104, also referred to herein as databases. The database servers 104 can access data that can be stored on a variety of hardware components. These hardware components can include, for example, components forming tier 0 storage, components forming tier 1 storage, components forming tier 2 storage, and/or any other tier of storage or memory. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems, and that is relatively slower than tier 0 memory and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein. In one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 0 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN). These one or several storage area networks can be one or several dedicated networks that provide access to data storage, and particularly that can provide access to consolidated, block level data storage. A SAN typically has its own network of storage devices that are generally not accessible through the local area network (LAN) by other devices. The SAN allows access to these devices in a manner such that these devices appear to be locally attached to the user device.

Databases 104 may comprise stored data relevant to the functions of the content delivery network 100. Illustrative examples of databases 104 that may be maintained in certain embodiments of the content delivery network 100 are described below in reference to FIG. 3. In some embodiments, multiple databases may reside on a single database server 104, either using the same storage components of server 104 or using different physical storage components to assure data security and integrity between databases. In other embodiments, each database may have a separate dedicated database server 104.

The content delivery network 100 also may include one or more user devices 106 and/or supervisor devices 110. In some embodiments, the user devices 106 and/or supervisor devices 110 allow a user including a student, a teacher, a supervisor/analyst including, for example, an administrator and/or parent, and/or a process analyst including, for example, a researcher, observer, social scientist, or data scientist, to access the CDN 100. User devices 106 and supervisor devices 110 may display content received via the content delivery network 100, and may support various types of user interactions with the content. In some embodiments, the user devices 106 and the supervisor devices 110 can be configured to access data in, edit data in, retrieve data from, and/or provide data to the data extraction and analysis system.

User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming system, business or home appliances, and/or personal messaging devices, capable of communicating over network(s) 120. In some embodiments, the designated role of a device, including a user device 106 or a supervisor device 110 can vary based on the identity of the user using that device. Thus, in some embodiments, both user and supervisor devices 106, 110 can include the same hardware, but can be configured as one of a user device 106 or a supervisor device 110 at the time of log-in by a user to use that device.

In different contexts of data extraction and analysis systems 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom, a clinic, or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content delivery network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in data extraction and analysis systems 100 used for professional training and educational purposes, content server 112 may include databases of training materials, presentations, plans, syllabi, reviews, evaluations, interactive programs and simulations, course models, course outlines, and various training interfaces that correspond to different materials and/or different types of user devices 106. In data extraction and analysis systems 100 used for media distribution, interactive gaming, and the like, a content server 112 may include media content files such as music, movies, television programming, games, and advertisements. In some embodiments, the one or several content servers 112 can be in communicating connection with the content management server 102 via, for example, the internet or other communication network.

In some embodiments, the content delivery network 100 can include a plurality of content servers 112 that can contain the same or different content. In some embodiments, this plurality of content servers 112 can be controlled as a part of the content delivery network 100, and in some embodiments, this plurality of content servers 112 can be controlled independent of the content delivery network 100. In such an embodiments, data can be transferred to and/or from one or several of the plurality of content servers 112 and some or all of the other components of the content delivery network 100.

In one embodiment, for example, the content delivery network 100 can include a first content server, a second content server, a third content server, and/or a fourth content server. In some embodiments, for example, some or all of the first, second, third, and fourth content servers can host websites, which can be unique. These websites can contain information that can be retrieved and/or used by some or all of the other components of the content delivery network 100. In some embodiments, the first content server can be configured to host and/or can host a first website containing a first portion of species data, the second content server can be configured to host and/or can host a second portion of species data, the third content server can be configured to host and/or can host a first portion of qualitative data, and/or the fourth content server can be configured to host and/or can host a second portion of qualitative data.

The one or several content servers 112 can be a source of one or several tasks such as, for example, one or several academic tasks and/or can be the source of some or all of the user profile data. Thus, in some embodiments, information such as, for example, the user's past interactions with the CDN 100 including courses of study and/or academic tasks that the user has completed, and the user's performance in those completed courses of study and/or academic tasks. These tasks can include, for example, tasks that do not request student input such as an article, a video, or other instructional information, and/or tasks that request student input such as a structured learning activity, one or several questions, an activity assigning roles and responsibility, or any activity resulting in student generated work product. In some embodiments, the one or several content servers 112 can comprise a database of one or more courses of study and/or one or more academic tasks. In some embodiments, for example, the educational resource can be a university, a school, an institution of learning, and/or a learning management system (LMS).

Data server 114, also referred to herein as a user data server 114, may include hardware and software components that store and process data for multiple users relating to each user's activities and usage of the content delivery network 100 or other systems. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content delivery network 100. For example, the administrator server 116 may monitor device status and performance for the various servers, databases, and/or user devices 106 in the content delivery network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content delivery network 100 may include one or more communication networks 120. Although only a single network 120 is identified in FIG. 1, the content delivery network 100 may include any number of different communication networks between any of the computer servers and devices shown in FIG. 1 and/or other devices described herein. Communication networks 120 may enable communication between the various computing devices, servers, and other components of the content delivery network 100. As discussed below, various implementations of data extraction and analysis systems 100 may employ different types of networks 120, for example, computer networks, telecommunications networks, wireless networks, and/or any combination of these and/or other networks.

In some embodiments, some of the components of the content delivery network 100 can belong to the content network 122. The content network 122 can include, for example, the content management server 102, the database server 104, the privacy server 108, the content server 112, the data server 114, the administrator server 116, and/or the communication network 120. The content network 122 can be the source of content distributed by the content delivery network 100, which content can include, for example, one or several documents and/or applications or programs. These documents and/or applications or programs are digital content. In some embodiments, these one or several documents and/or applications or programs can include, for example, one or several webpages, presentations, papers, videos, charts, graphs, books, written work, figures, images, graphics, recordings, applets, scripts, or the like.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 123.

In some embodiments, navigation system 123 can include or several features that can communicate with one or several components of the content distribution network 100 including, for example, with one or several of the user devices 106 and/or with one or several of the supervisor devices 110. In some embodiments, this communication can include the transmission of a signal from the navigation system 123 which signal is received by one or several components of the content distribution network 100 and can be used to determine the location of the one or several components of the content distribution network 100.

Figure 2:
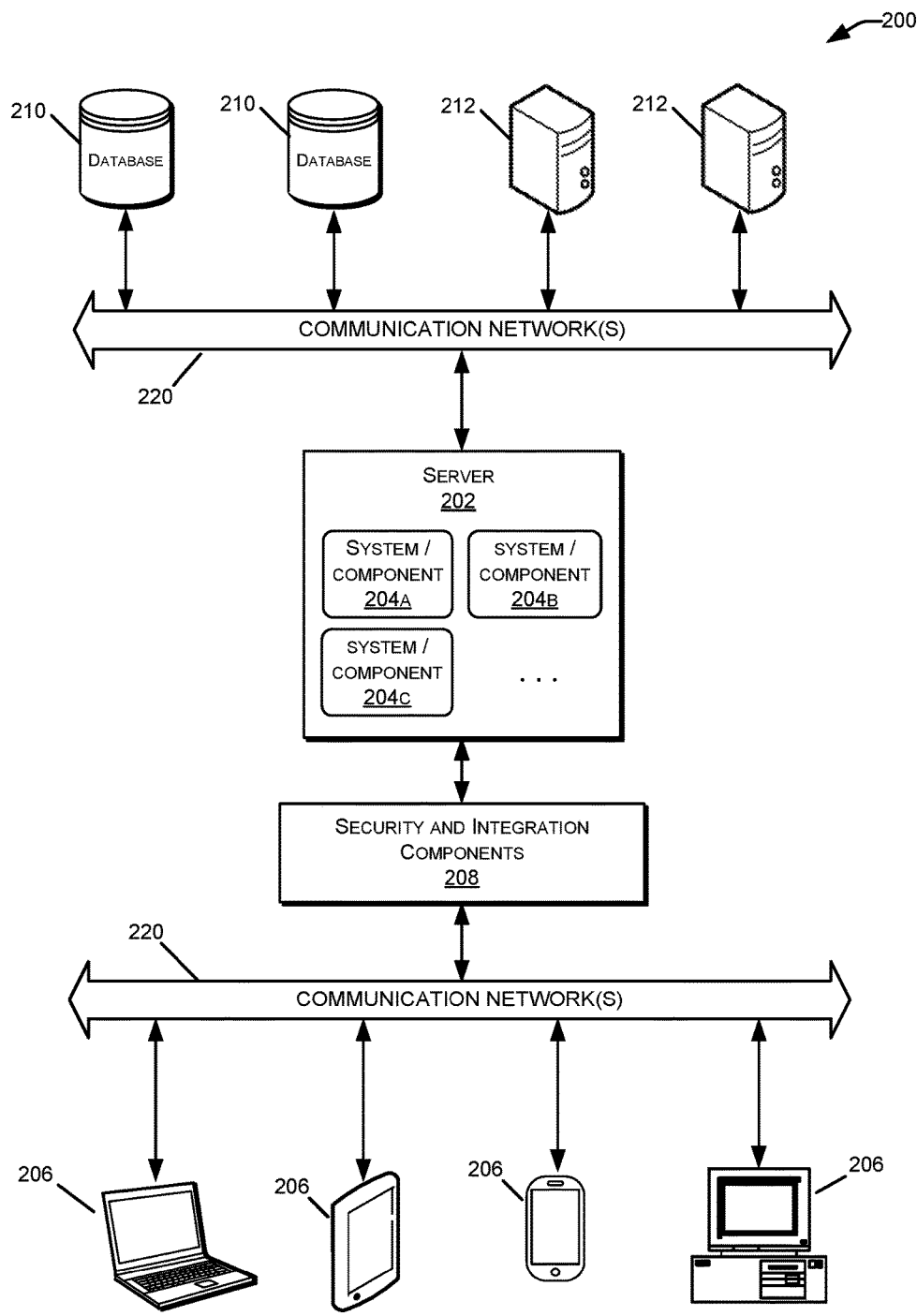
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and data extraction and analysis systems 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content delivery network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content delivery network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. For example, some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard, which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more databases 210 and/or back-end servers 212. In certain examples, the databases 210 may correspond to database server(s) 104, the local data server 109, and/or the customizer data server 128 discussed above in FIG. 1, and back-end servers 212 may correspond to the various back-end servers 112-116. Databases 210 and servers 212 may reside in the same datacenter or may operate at a remote location from server 202. In some cases, one or more databases 210 may reside on a non-transitory storage medium within the server 202. Other databases 210 and back-end servers 212 may be remote from server 202 and configured to communicate with server 202 via one or more networks 220. In certain embodiments, databases 210 and back-end servers 212 may reside in a storage-area network (SAN), or may use storage-as-a-service (STaaS) architectural model. In some embodiments, the computing environment can be replicated for each of the networks 105, 122, 104 discussed with respect to FIG. 1 above.

Figure 3:
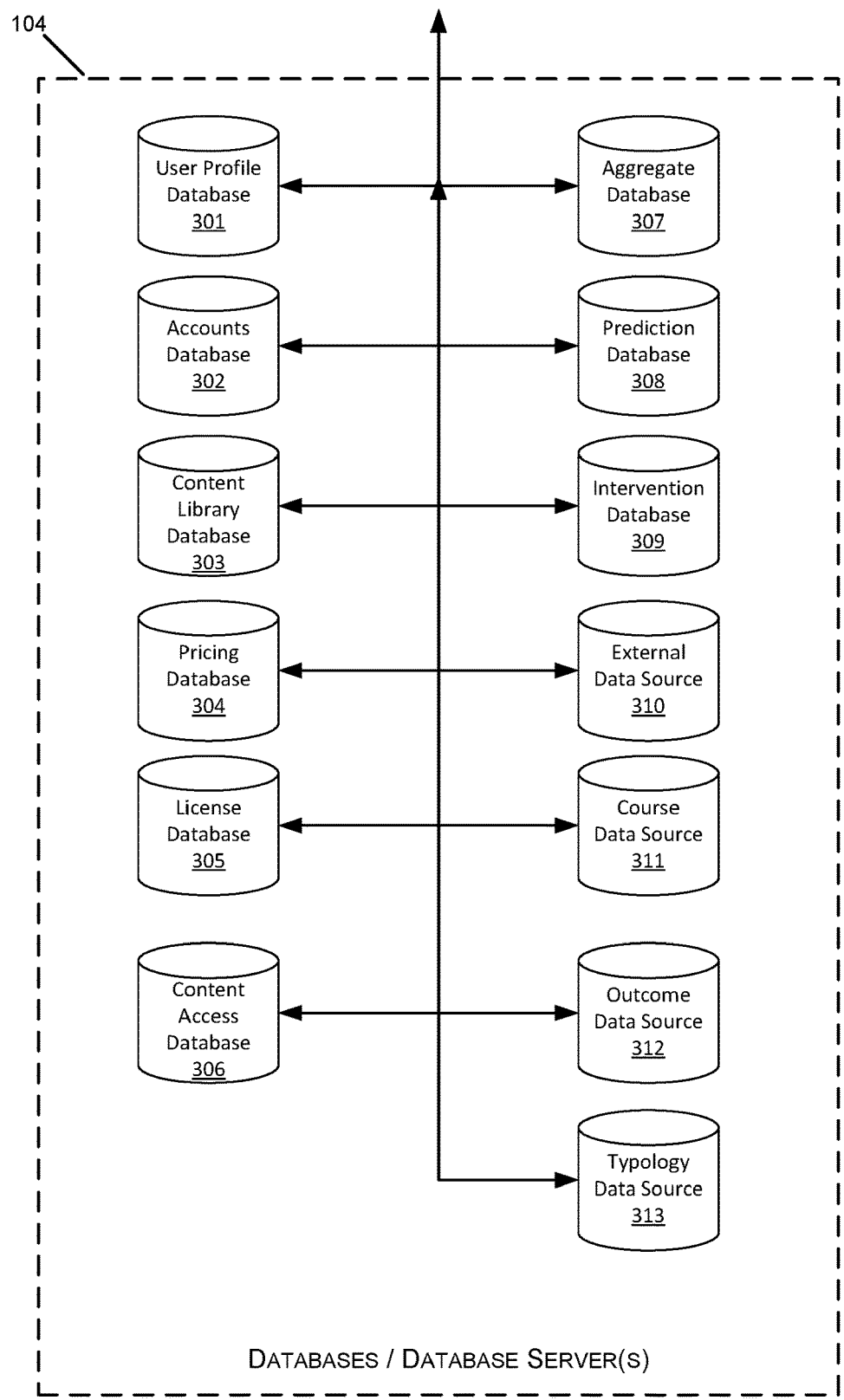
FIG. 3 is a block diagram illustrating an embodiment of one or more data store servers within a content distribution network.

With reference to FIG. 3, an illustrative set of databases and/or database servers is shown, corresponding to the databases servers 104 of the content delivery network 100 discussed above in FIG. 1. One or more individual databases 301-310 may reside in storage on a single computer server 104 (or a single server farm or cluster) under the control of a single entity, or may reside on separate servers operated by different entities and/or at remote locations. In some embodiments, databases 301-310 may be accessed by the content management server 102 and/or other devices and servers within the network 100 (e.g., user devices 106, supervisor devices 110, administrator servers 116, etc.). Access to one or more of the databases 301-310 may be limited or denied based on the processes, user credentials, and/or devices attempting to interact with the database.

The paragraphs below describe examples of specific databases that may be implemented within some embodiments of a content delivery network 100. It should be understood that the below descriptions of databases 301-310, including their functionality and types of data stored therein, are illustrative and non-limiting. Database server architecture, design, and the execution of specific databases 301-310 may depend on the context, size, and functional requirements of a content delivery network 100. For example, in content distribution systems 100 used for professional training and educational purposes, separate databases may be implemented in database server(s) 104 to store trainee and/or student data, trainer and/or professor data, training module data and content descriptions, training results, evaluation data, and the like. In contrast, in content distribution systems 100 used for media distribution from content providers to subscribers, separate databases may be implemented in database server(s) 104 to store listing of available content titles and descriptions, content title usage statistics, subscriber profiles, account data, payment data, network usage statistics, etc.

A user profile database 301 may include information relating to the end users within the content delivery network 100. Generally speaking the user profile database 301 can be a database having restrictions on access, which restrictions can relate to whether one or several users or categories of users are enabled to perform one or several actions on the database or on data stored in the database. In some embodiments, the user profile database 301 can include any information for which access is restricted. This information may include user characteristics such as the user names, access credentials (e.g., logins and passwords), user preferences, and information relating to any previous user interactions within the content delivery network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

In some embodiments, the user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in-is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the user, also referred to herein as the student or the student-user may have one or several preferred learning styles, one or several most effective learning styles, and/or the like. In some embodiments, the students learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

In some embodiments, the user profile database 301 can include information relating to one or several student-user behaviours including, for example: attendance in one or several courses; attendance and/or participation in one or several study groups; extramural, student group, and/or club involve and/or participation, or the like. In some embodiments, this information relating to one or several student-user behaviours can include information relating to the student-users schedule.

In some embodiments, the user profile database 301 can include response data. In some embodiments, the response data can include information relating to one or several actions taken by the user including, for example, responses or comments by the user. In some embodiments, the response data can store the response, store information relating to the response such as, for example, information indicating the substance, style, nature, and/or timing of the response, or the like. In some embodiments, the response data can further include one or several values indicating the results of one or several evaluations of the response data. In some embodiments, one of these values can include, for example, a composite response score that will be discussed in greater detail below.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts database 302 may generate and store account data for different users in various roles within the content delivery network 100. For example, accounts may be created in an accounts database 302 for individual end users, supervisors, administrator users, and entities such as companies or educational institutions. Account data may include account types, current account status, account characteristics, and any parameters, limits, restrictions associated with the accounts.

A content library database 303 may include information describing the individual content items (or content resources) available via the content delivery network 100. In some embodiments, the library database 303 may include metadata, properties, and other characteristics associated with the content resources stored in the content server 112. In some embodiments, this data can include the one or several items, also referred to herein as content items that can include one or several documents and/or one or several applications or programs. In some embodiments, the one or several items can include, for example, one or several webpages, presentations, papers, videos, charts, graphs, books, written work, figures, images, graphics, recordings, or any other document, or any desired software or application or component thereof including, for example, a graphical user interface (GUI), all or portions of a Learning Management System (LMS), all or portions of a Content Management System (CMS), all or portions of a Student Information Systems (SIS), or the like.

In some embodiments, the data in the content library database 303 may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library database 303 may be configured to allow updating of content metadata or properties, and to allow the addition and/or removal of information relating to the content resources. In some embodiments, the content library database 303 can be organized such that content is associated with one or several courses and/or programs in which the content is used and/or provided. In some embodiments, the content library database 303 can further include one or several teaching materials used in the course, a syllabus, one or several practice problems, one or several tests, one or several quizzes, one or several assignments, or the like. All or portions of the content library database can be stored in a tier of memory that is not the fastest memory in the content delivery network 100.

In some embodiments, the content library database 303 can comprise information to facilitate in authoring new content. This information can comprise, for example, one or several specifications identifying attributes and/or requirements of desired newly authored content. In some embodiments, for example, a content specification can identify one or several of a subject matter; length, difficulty level, or the like for desired newly authored content.

In some embodiments, the content library database 303 can further include information for use in evaluating newly authored content. In some embodiments, this evaluation can comprise a determination of whether and/or the degree to which the newly authored content corresponds to the content specification, or some or all of the requirements of the content specification. In some embodiments, this information for use in evaluation newly authored content can identify or define one or several difficulty levels and/or can identify or define one or several acceptable difficulty levels. In some embodiments, for example, this information for use in evaluation newly authored content can define a plurality of difficulty levels and can delineate between these difficulty levels, and in some embodiments, this information for use in evaluation newly authored content can identify which of the defined difficulty levels are acceptable. In other embodiments, this information for use in evaluation newly authored content can merely include one or several definitions of acceptable difficulty levels, which acceptable difficulty level can be based on one or several pre-existing difficult measures such as, for example, an Item Response Theory (IRT) value such as, for example, an IRT b value, a p value indicative of the proportion of correct responses in a set of responses, a grade level, or the like.

In some embodiments, this information for use in evaluation newly authored content can further define one or several differentiation and/or discrimination levels and/or define one or several acceptable differentiation and/or discrimination levels or ranges. As used herein, "differentiation" and "discrimination" refer to the degree to which an item such as a question identifies low ability versus high ability users. In some embodiments, this information for use in evaluation newly authored content can identify one or several acceptable levels and/or ranges of discrimination which levels and/or ranges can be based on one or several currently existing discrimination measures such as, for example, a Point-Biserial Correlation.

A pricing database 304 may include pricing information and/or pricing structures for determining payment amounts for providing access to the content delivery network 100 and/or the individual content resources within the network 100. In some cases, pricing may be determined based on a user's access to the content delivery network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the users and the desired level of access (e.g., duration of access, network speed, etc.). Additionally, the pricing database 304 may include information relating to compilation pricing for groups of content resources, such as group prices and/or price structures for groupings of resources.

A license database 305 may include information relating to licenses and/or licensing of the content resources within the content delivery network 100. For example, the license database 305 may identify licenses and licensing terms for individual content resources and/or compilations of content resources in the content server 112, the rights holders for the content resources, and/or common or large-scale right holder information such as contact information for rights holders of content not included in the content server 112.

A content access database 306 may include access rights and security information for the content delivery network 100 and specific content resources. For example, the content access database 306 may include login information (e.g., user identifiers, logins, passwords, etc.) that can be verified during user login attempts to the network 100. The content access database 306 also may be used to store assigned roles and/or levels of access to users. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

An aggregate database 307 can include information gathered from one or several sources, also referred to herein as data sources relating to one or several students. In some embodiments, the information within the aggregate database 307 can be organized by student and/or retrievable by student such that all of the information relating to a student can be accessed and retrieved. This information can be received from one or more data sources which can include one or more data sources controlled by the content management server 102 or can include one or more data sources that are not controlled by the content management server 102 but can, in some embodiments, be controlled by a third party. In some embodiments, these data sources can include, for example, one or more of the content server 112, the data servers 114, the administrator server 116, or the like. In some embodiments, one or more of these data sources can include, for example, a Learning Management System (LMS) including: information relating to documents accessed by a student; tasks started and/or completed by a student; correct or incorrect answers or responses by a student; student work product; or the like, a Student Information System (SIS), a gradebook including an electronic gradebook, a library and/or a networked system of a library, an advisory system, an instructor feedback system whereby an instructor can, for example, flag a student, one or several learning applications, student location and/or proximity information, course attendance information, or the like.

In some embodiments, this information that is received from the one or several data sources can be structured or unstructured. In some embodiments in which the received data is structured, the received data can be provided by one or several applications operating on the one or more data sources and/or by accessing data from the one or more data sources. Such applications can be configured, for example, to identify and/or retrieve desired information, to, if desired, reformat and/or restructure the data, and/or to provide the data to the content management server 102. In some embodiments, the data from the data sources can be restructured and/or reformatted by the content management server 102 before storing in the aggregate database 307.

A prediction database 308 can include information used in generating an outcome prediction for a user such as a student. In some embodiments, for example, the prediction database 308 can include information creating one or several predictive models used in predicting a user outcome and/or can include information for use in creating one or several predictive models for predicting a user outcome. In some embodiments, this information can be data collected from users of the data sources and/or from the outcomes achieved by those users. In some embodiments these users can be past or present users of the data sources.

An intervention database 309 can include information used to generate an intervention recommendation. In some embodiments, the intervention recommendation can comprise one or several actions to be taken by a computer, the content management server 102, and/or by a supervisor of the user-student to mitigate the risk of a predicted adverse outcome and/or to increase the likelihood of a predicted positive outcome. These interventions can include, for example, life coaching or assistance, lifestyle coaching or assistance, social or cultural coaching or assistance, habit counseling or assistance, work habit coaching or assistance, academic coaching or assistance, or any other form of coaching, counseling, support, or assistance. In some embodiments, an intervention can include, for example: placement in a study group; placement with a mentor, friend, or coach; tutoring; remedial tasks or assignments; work-habit or work-skill training; follow-up contact such as a text, email, or call; or the like.

In some embodiments, the intervention database 309 can include an intervention model that can be used in generating and/or identifying an intervention for providing to the user. This intervention model can be, for example, a statistical model that can be dynamic and adaptive based on the results of past interventions. In some embodiments, the intervention model can be adaptive to identify the best and/or worst interventions, to the identify the best and/or worst interventions for a student or student type, or the like.

In addition to the illustrative databases described above, database server(s) 104 may include one or more external data aggregators 310. External data aggregators 310 may include third-party data sources accessible to the content management network 100, but not maintained by the content management network 100. External data aggregators 310 may include any electronic information source relating to the users, content resources, or applications of the content delivery network 100. For example, external data aggregators 310 may be third-party databases containing demographic data, education related data, consumer sales data, health related data, and the like. Illustrative external data aggregators 310 may include, for example, social networking web servers, public records databases, learning management systems, educational institution servers, business servers, consumer sales databases, medical record databases, etc. Data retrieved from various external data aggregators 310 may be used to verify and update user account information, suggest user content, and perform user and content evaluations.

A course database 311 can include information relating to a course of study, a group of courses, or a program that can include, for example, the collection of courses making up a degree, a grade, or the like. This information can include, for example, educational material, user performance indicator data such as, for example, grade data for users participating in the course of study, or data identifying the users participating in the course of study.

In some embodiments, the course database 311 can further include information on groups which can be formal and/or informal, or communities. In some embodiments, these groups and/or communities can exist within a course, a group of courses, and/or a program or course of study, and in some embodiments, these groups and/or communities can exist across courses, groups of courses, and/or across programs or courses of study, and can be related and/or unrelated to a course, a group of courses, and/or a program or course of study. Advantageously, the groups and/or communities can facilitate education by encouraging the transfer of ideas between individuals.

In some embodiments, the course database 311 can further include educational activities and information regarding the design of those activities. Advantageously, the inclusion of education activities and information regarding the design of those activities can facilitate the generation of understanding of the student-teacher relationship and/or interactions and can be used, for example, to compare and/or predict outcomes.

An outcome database 312 can include information relating to one or several outcomes. This information can include, for example, the identification of one or several outcomes, and/or relationships between the one or several outcomes. The outcome information can be input into the CDN 100 via one or several users and/or can be imported from another system associated with the CDN 100.

A typology database 313 can include information relating to one or several typologies. This information can include, for example, data identifying characteristics of the typology, criteria for the typology, behaviors associated with the typology, other related typologies, and/or outcomes associated with the typology. In some embodiments, for example, the typology database 313 can include criteria, also referred to herein as classification data, for use in analyzing user data to determine the user's typology. In some embodiments, for example, these criteria can allow the binary classification of the user's typology, or the indication of the degree of the user's demonstration of the typology. Thus, these criteria can be used to classify the user as exhibiting the typology and/or to indicate the degree to which the user exhibits the typology.

Figure 4A:
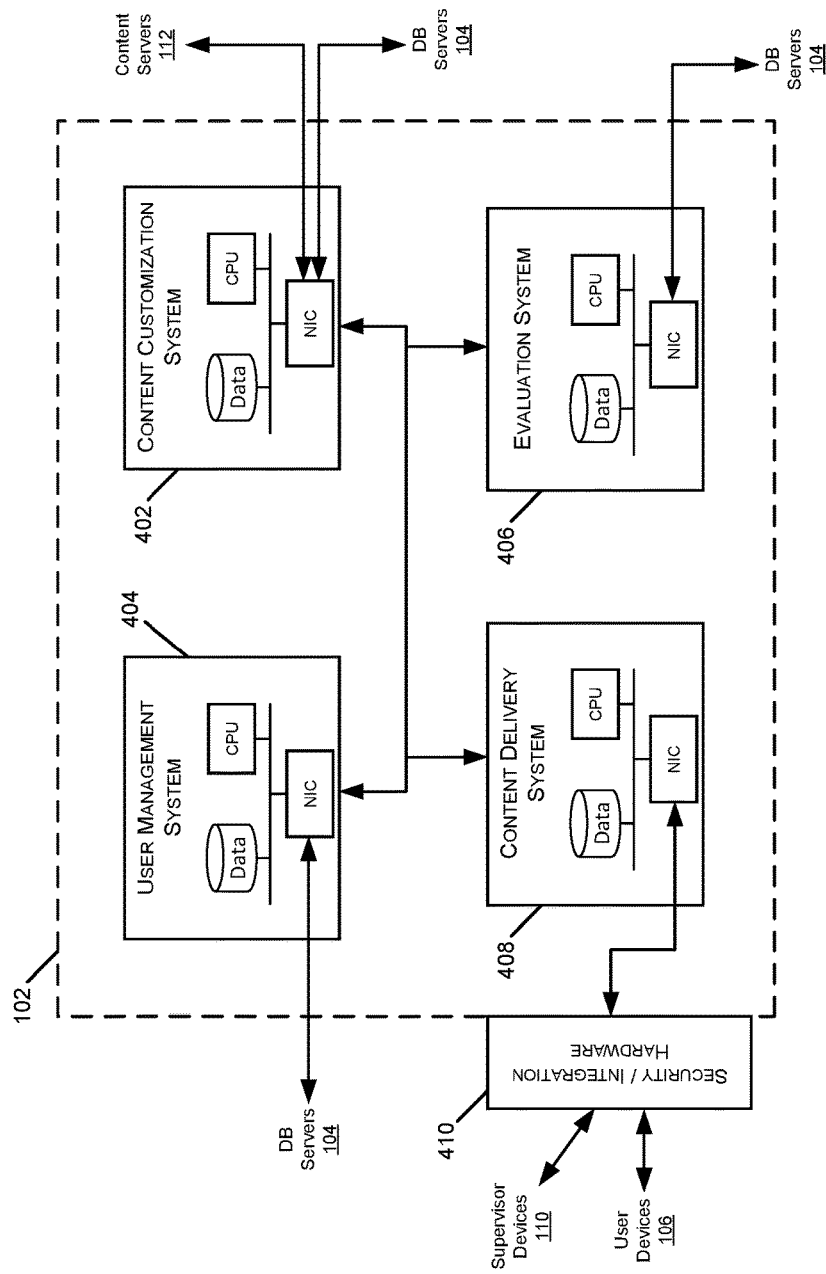
FIG. 4A is a block diagram illustrating an embodiment of one or more content management servers within a content distribution network.

With reference now to FIG. 4A, a block diagram is shown illustrating an embodiment of one or more content management servers 102 within a content delivery network 100. As discussed above, content management server(s) 102 may include various server hardware and software components that manage the content resources within the content delivery network 100 and provide interactive and adaptive content to users on various user devices 106. For example, content management server(s) 102 may provide instructions to and receive information from the other devices within the content delivery network 100, in order to manage and transmit content resources, user data, and server or client applications executing within the network 100.

A content management server 102 may include a content customization system 402. The content customization system 402 may be implemented using dedicated hardware within the content delivery network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various databases and servers 104 to retrieve user information, such as user preferences and characteristics (e.g., from a user profile database 301), user access restrictions to content recourses (e.g., from a content access database 306), and the like. Based on the retrieved information from databases 104 and other data sources, the content customization system 402 may modify content resources for individual users.

In some embodiments, the content management system 402 can include a recommendation engine, also referred to herein as an adaptive recommendation engine. In some embodiments, the recommendation engine can select one or several pieces of content, also referred to herein as data packets, for providing to a user. These data packets can be selected based on, for example, the information retrieved from the database server 104 including, for example, the user profile database 301, the content library database 303, the model database 309, or the like. In one embodiment, for example, the recommendation engine can retrieve information from the user profile database 301 identifying, for example, a skill level of the user. The recommendation engine can further retrieve information from the content library database 303 identifying, for example, potential data packets for providing to the user and the difficulty of those data packets and/or the skill level associated with those data packets.

The recommendation engine can use the evidence model to generate a prediction of the likelihood of one or several users providing a desired response to some or all of the potential data packets. In some embodiments, the recommendation engine can pair one or several data packets with selection criteria that may be used to determine which packet should be delivered to a student-user based on one or several received responses from that student-user. In some embodiments, one or several data packets can be eliminated from the pool of potential data packets if the prediction indicates either too high a likelihood of a desired response or too low a likelihood of a desired response. In some embodiments, the recommendation engine can then apply one or several selection criteria to the remaining potential data packets to select a data packet for providing to the user. These one or several selection criteria can be based on, for example, criteria relating to a desired estimated time for receipt of response to the data packet, one or several content parameters, one or several assignment parameters, or the like.

A content management server 102 also may include a user management system 404. The user management system 404 may be implemented using dedicated hardware within the content delivery network 100 (e.g., a user management server 404), or using designated hardware and software resources within a shared content management server 102. In some embodiments, the user management system 404 may monitor the progress of users through various types of content resources and groups, such as media compilations, courses or curriculums in training contexts, interactive gaming environments, and the like. For example, the user management system 404 may query one or more databases and servers 104 to retrieve user data such as associated content compilations or programs, content completion status, user goals, results, and the like.

A content management server 102 also may include an evaluation system 406. The evaluation system 406 may be implemented using dedicated hardware within the content delivery network 100 (e.g., an evaluation server 406), or using designated hardware and software resources within a shared content management server 102. The evaluation system 406 may be configured to receive and analyze information from user devices 106 via, for example, the end-user server 107. For example, various ratings of content resources submitted by users may be compiled and analyzed, and then stored in a database (e.g., a content library database 303) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

In some embodiments, the evaluation system 406 can be further configured to receive one or several responses from the user and to determine whether the one or several response are correct responses, also referred to herein as desired responses, or are incorrect responses, also referred to herein as undesired responses. In some embodiments, one or several values can be generated by the evaluation system 406 to reflect user performance in responding to the one or several data packets. In some embodiments, these one or several values can comprise one or several scores for one or several responses and/or data packets.

A content management server 102 also may include a content delivery system 408. The content delivery system 408 may be implemented using dedicated hardware within the content delivery network 100 (e.g., a content delivery server 408), or using designated hardware and software resources within a shared content management server 102. The content delivery system 408 can include a presentation engine that can be, for example, a software module running on the content delivery system.

The content delivery system 408, also referred to herein as the presentation module or the presentation engine, may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 4B:
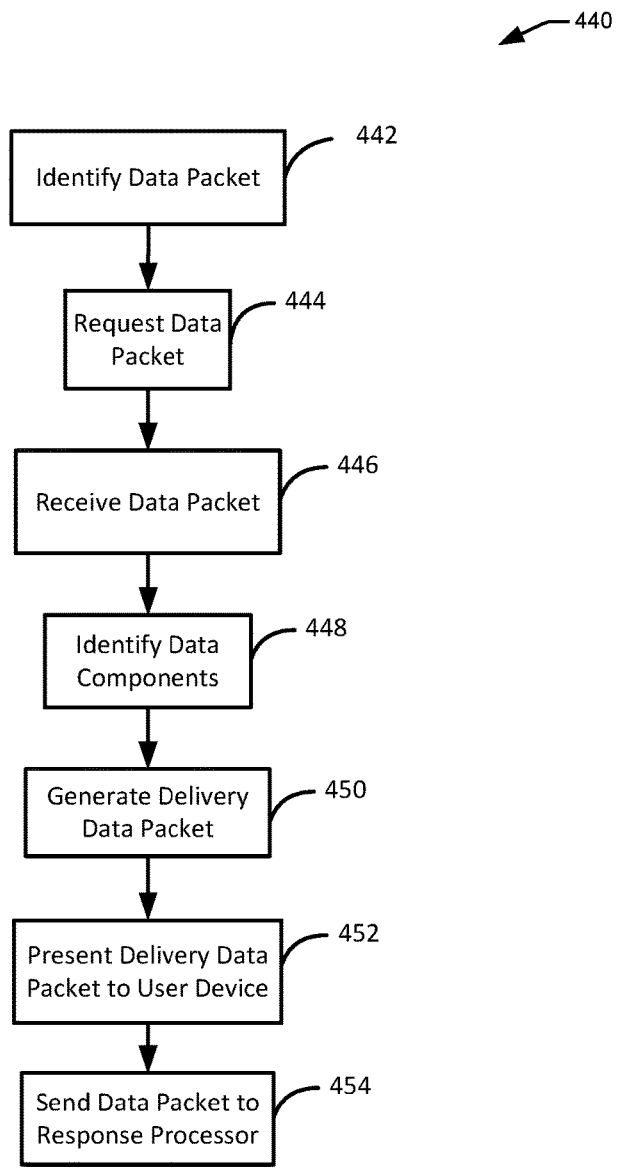
FIG. 4B is a flowchart illustrating one embodiment of a process for data management.

With reference now to FIG. 4B, a flowchart illustrating one embodiment of a process 440 for data management is shown. In some embodiments, the process 440 can be performed by the content management server 102, and more specifically by the content delivery system 408 and/or by the presentation module or presentation engine. The process 440 begins at block 442, wherein a data packet is identified. In some embodiments, the data packet can be a data packet for providing to a student-user, and the data packet can be identified by determining which data packet to next provide to the user such as the student-user. In some embodiments, this determination can be performed by the content customization system 402 and/or the recommendation engine.

After the data packet has been identified, the process 440 proceeds to block 444, wherein the data packet is requested. In some embodiments, this can include the requesting of information relating to the data packet such as the data forming the data packet. In some embodiments, this information can be requested from, for example, the content library database 303. After the data packet has been requested, the process 440 proceeds to block 446, wherein the data packet is received. In some embodiments, the data packet can be received by the content delivery system 408 from, for example, the content library database 303.

After the data packet has been received, the process 440 proceeds to block 448, wherein one or several data components are identified. In some embodiments, for example, the data packet can include one or several data components which can, for example, contain different data. In some embodiments, one of these data components, referred to herein as a presentation component, can include content for providing to the student user, which content can include one or several requests and/or questions and/or the like. In some embodiments, one of these data components, referred to herein as a response component, can include data used in evaluating one or several responses received from the user device 106 in response to the data packet, and specifically in response to the presentation component and/or the one or several requests and/or questions of the presentation component. Thus, in some embodiments, the response component of the data packet can be used to ascertain whether the user has provided a desired response or an undesired response.

After the data components have been identified, the process 440 proceeds to block 450, wherein a delivery data packet is identified. In some embodiments, the delivery data packet can include the one or several data components of the data packets for delivery to a user such as the student-user via the user device 106. In some embodiments, the delivery packet can include the presentation component, and in some embodiments, the delivery packet can exclude the response packet. After the delivery data packet has been generated, the process 440 proceeds to block 452, wherein the delivery data packet is presented to the user device 106. In some embodiments, this can include providing the delivery data packet to the user device 106 via, for example, the communication network 120.

After the delivery data packet has been provided to the user device, the process 440 proceeds to block 454, wherein the data packet and/or one or several components thereof is sent to and/or provided to the response processor. In some embodiments, this sending of the data packet and/or one or several components thereof to the response processor can include receiving a response from the student-user, and sending the response to the student-user to the response processor simultaneous with the sending of the data packet and/or one or several components thereof to the response processor. In some embodiments, for example, this can include providing the response component to the response processor. In some embodiments, the response component can be provided to the response processor from the content delivery system 408.

Figure 4C:
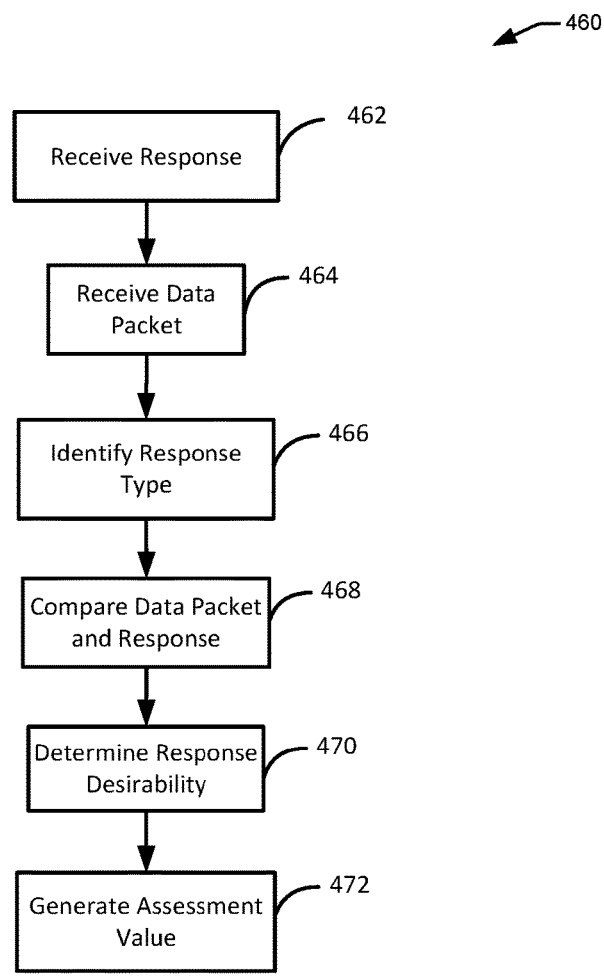
FIG. 4C is a flowchart illustrating one embodiment of a process for evaluating a response.

With reference now to FIG. 4C, a flowchart illustrating one embodiment of a process 460 for evaluating a response is shown. In some embodiments, the process can be performed by the evaluation system 406. In some embodiments, the process 460 can be performed by the evaluation system 406 in response to the receipt of a response from the user device 106.

The process 460 begins at block 462, wherein a response is received from, for example, the user device 106 via, for example, the communication network 120. After the response has been received, the process 460 proceeds to block 464, wherein the data packet associated with the response is received. In some embodiments, this can include receiving all or one or several components of the data packet such as, for example, the response component of the data packet. In some embodiments, the data packet can be received by the response processor from the presentation engine.

After the data packet has been received, the process 460 proceeds to block 466, wherein the response type is identified. In some embodiments, this identification can be performed based on data, such as metadata associated with the response. In other embodiments, this identification can be performed based on data packet information such as the response component.

In some embodiments, the response type can identify one or several attributes of the one or several requests and/or questions of the data packet such as, for example, the request and/or question type. In some embodiments, this can include identifying some or all of the one or several requests and/or questions as true/false, multiple choice, short answer, essay, or the like.

After the response type has been identified, the process 460 proceeds to block 468, wherein the data packet and the response are compared to determine whether the response comprises a desired response and/or an undesired response. In some embodiments, this can include comparing the received response and the data packet to determine if the received response matches all or portions of the response component of the data packet, to determine the degree to which the received response matches all or portions of the response component, to determine the degree to which the receive response embodies one or several qualities identified in the response component of the data packet, or the like. In some embodiments, this can include classifying the response according to one or several rules. In some embodiments, these rules can be used to classify the response as either desired or undesired. In some embodiments, these rules can be used to identify one or several errors and/or misconceptions evidenced in the response. In some embodiments, this can include, for example: use of natural language processing software and/or algorithms; use of one or several digital thesauruses; use of lemmatization software, dictionaries, and/or algorithms; or the like.

After the data packet and the response have been compared, the process 460 proceeds to block 470 wherein response desirability is determined. In some embodiments this can include, based on the result of the comparison of the data packet and the response, whether the response is a desired response or is an undesired response. In some embodiments, this can further include quantifying the degree to which the response is a desired response. This determination can include, for example, determining if the response is a correct response, an incorrect response, a partially correct response, or the like. In some embodiments, the determination of response desirability can include the generation of a value characterizing the response desirability and the storing of this value in one of the databases 104 such as, for example, the user profile database 301. After the response desirability has been determined, the process 460 proceeds to block 472, wherein an assessment value is generated. In some embodiments, the assessment value can be an aggregate value characterizing response desirability for one or more a plurality of responses. This assessment value can be stored in one of the databases 104 such as the user profile database 301.

Figure 5:
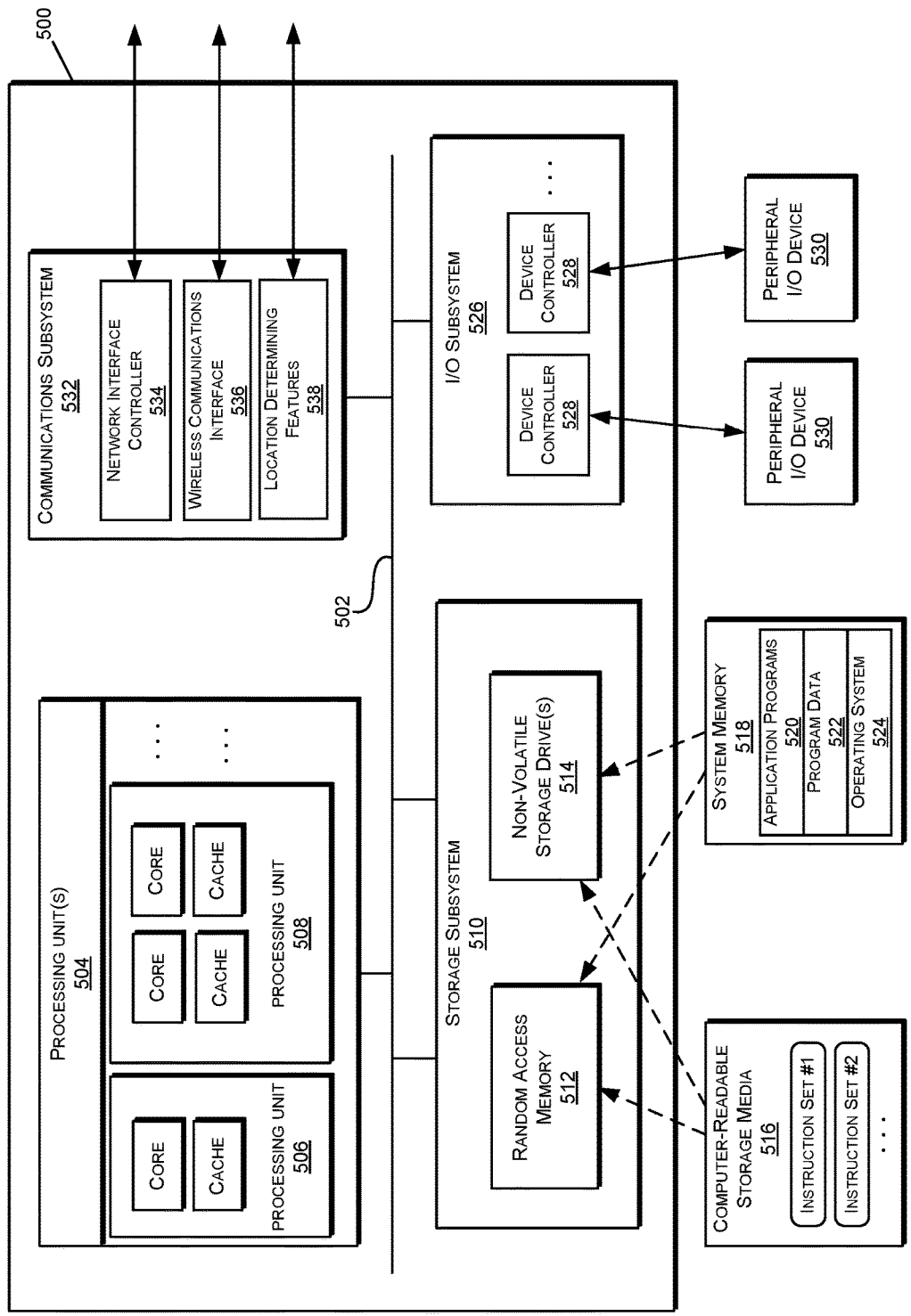
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content delivery network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 310). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more databases 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
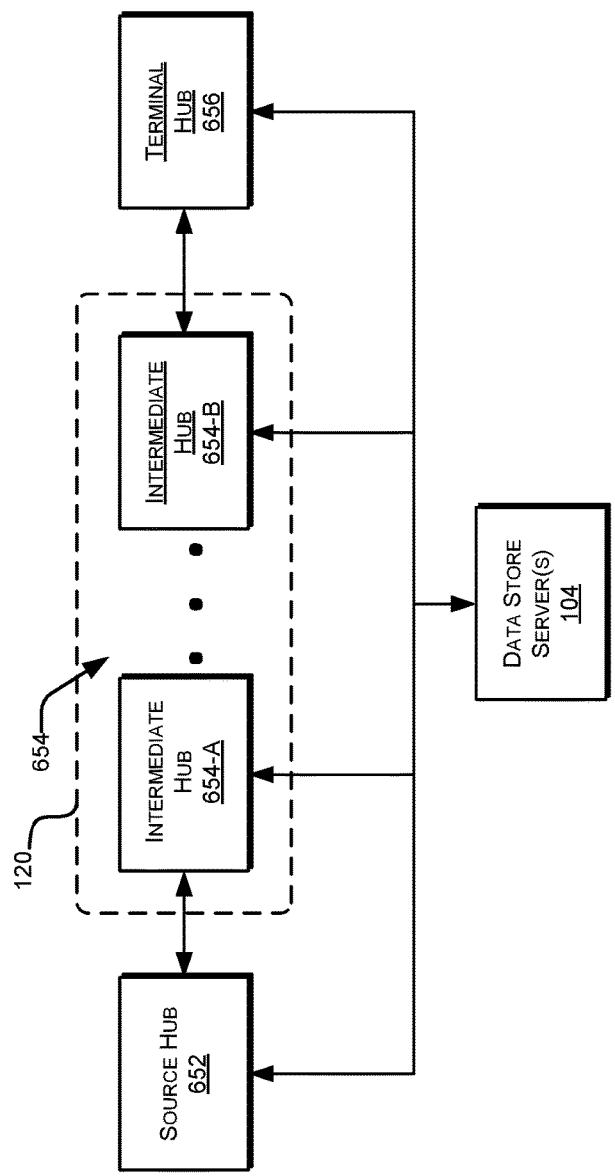
FIG. 6 is a block diagram illustrating one embodiment of the communication network.

With reference now to FIG. 6, a block diagram illustrating one embodiment of the communication network is shown. Specifically, FIG. 6 depicts one hardware configuration in which messages are exchanged between a source hub 652 via the communication network 120 that can include one or several intermediate hubs 654. In some embodiments, the source hub 652 can be any one or several components of the content distribution network generating and initiating the sending of a message, and the terminal hub 656 can be any one or several components of the content distribution network 100 receiving and not re-sending the message. In some embodiments, for example, the source hub 652 can be one or several of the user device 106, the supervisor device 110, and/or the server 102, and the terminal hub 656 can likewise be one or several of the user device 106, the supervisor device 110, and/or the server 102. In some embodiments, the intermediate hubs 654 can include any computing device that receives the message and resends the message to a next node.

As seen in FIG. 6, in some embodiments, each of the hubs 652, 654, 656 can be communicatingly connected with the data store 104. In such an embodiments, some or all of the hubs 652, 654, 656 can send information to the data store 104 identifying a received message and/or any sent or resent message. This information can, in some embodiments, be used to determine the completeness of any sent and/or received messages and/or to verify the accuracy and completeness of any message received by the terminal hub 656.

In some embodiments, the communication network 120 can be formed by the intermediate hubs 654. In some embodiments, the communication network 120 can comprise a single intermediate hub 654, and in some embodiments, the communication network 120 can comprise a plurality of intermediate hubs. In one embodiment, for example, and as depicted in FIG. 6, the communication network 120 includes a first intermediate hub 654-A and a second intermediate hub 654-B.

Figure 7:
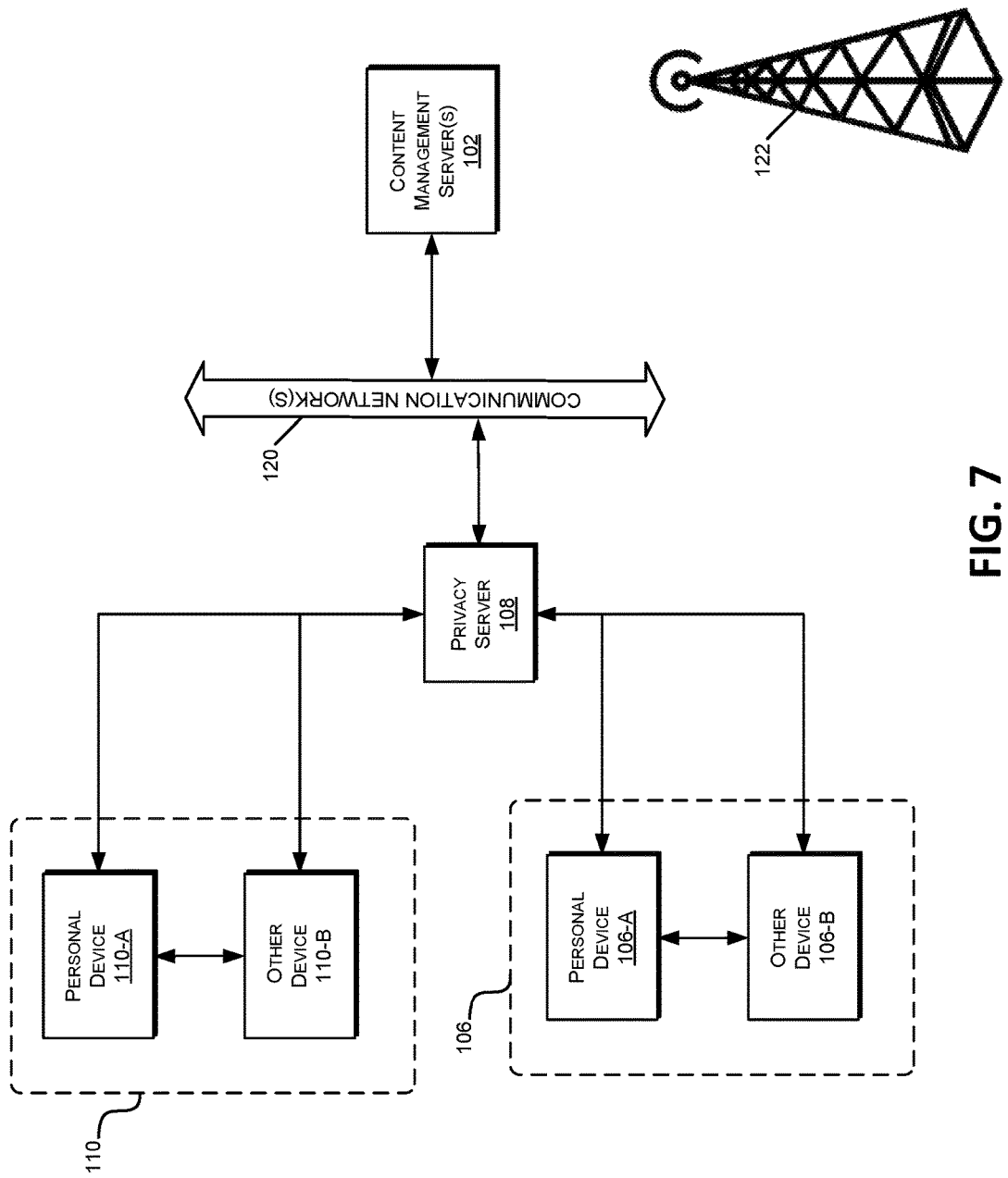
FIG. 7 is a block diagram illustrating one embodiment of user device and supervisor device communication.

With reference now to FIG. 7, a block diagram illustrating one embodiment of user device 106 and supervisor device 110 communication is shown. In some embodiments, for example, a user may have multiple devices that can connect with the content distribution network 100 to send or receive information. In some embodiments, for example, a user may have a personal device such as a mobile device, a Smartphone, a tablet, a Smartwatch, a laptop, a PC, or the like. In some embodiments, the other device can be any computing device in addition to the personal device. This other device can include, for example, a laptop, a PC, a Smartphone, a tablet, a Smartwatch, or the like. In some embodiments, the other device differs from the personal device in that the personal device is registered as such within the content distribution network 100 and the other device is not registered as a personal device within the content distribution network 100.

Specifically with respect to FIG. 7, the user device 106 can include a personal user device 106-A and one or several other user devices 106-B. In some embodiments, one or both of the personal user device 106-A and the one or several other user devices 106-B can be communicatingly connected to the content management server 102 and/or to the navigation system 122. Similarly, the supervisor device 110 can include a personal supervisor device 110-A and one or several other supervisor devices 110-B. In some embodiments, one or both of the personal supervisor device 110-A and the one or several other supervisor devices 110-B can be communicatingly connected to the content management server 102 and/or to the navigation system 122.

In some embodiments, the content distribution network can send one or more alerts to one or more user devices 106 and/or one or more supervisor devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to page or portal associated with the alert.

In some embodiments, for example, the providing of this alert can include the identification of one or several user devices 106 and/or student-user accounts associated with the student-user and/or one or several supervisor devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device.

Specifically, if the user is actively using one of the devices 106, 110 such as the other user device 106-B and the other supervisor device 110-B, and/or accounts, the alert can be provided to the user via that other device 106-B, 110-B and/or account that is actively being used. If the user is not actively using an other device 106-B, 110-B and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an aural, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an aural, tactile, and/or visual indicator of the alert and/or of the receipt of the alert. In some embodiments, this can include controlling a screen of the supervisor device 110 to display the alert, data contained in alert and/or an indicator of the alert.

Figure 8:
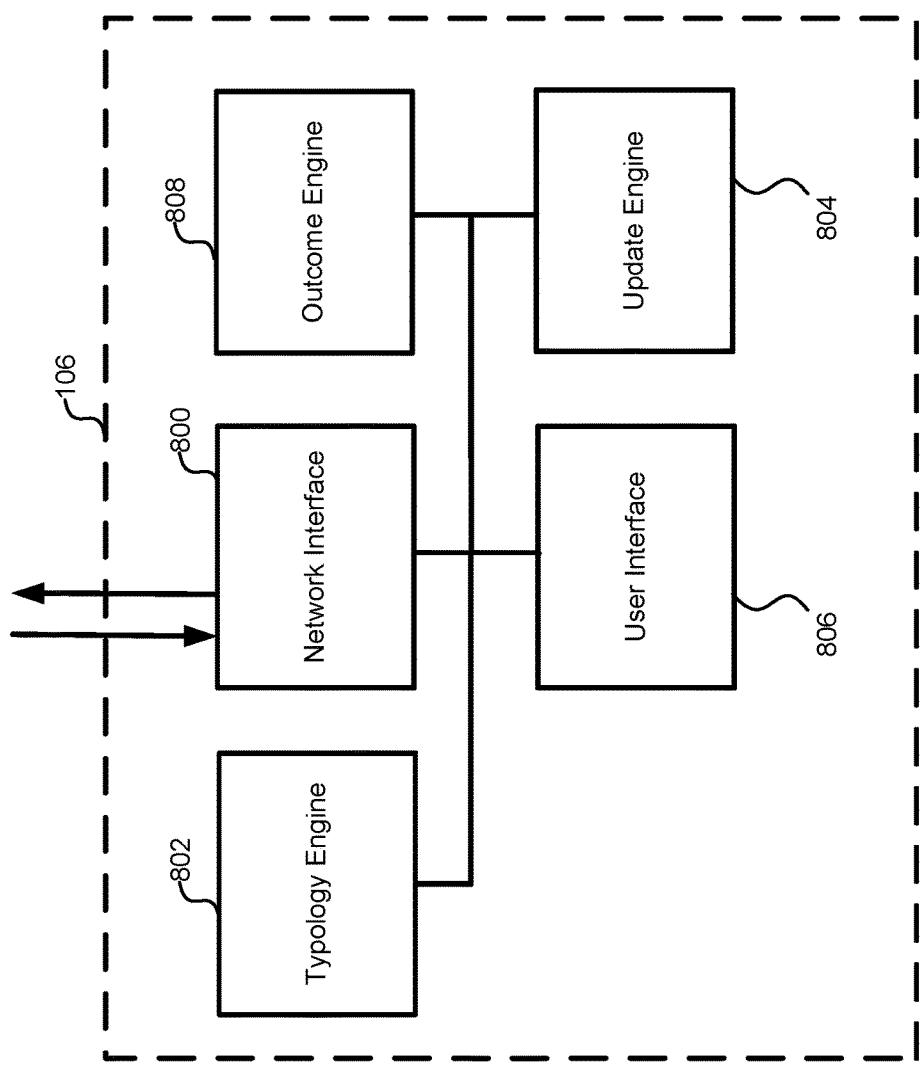
FIG. 8 is a schematic illustration of one embodiment of a user device for use with a network-based intervention system.

With reference now to FIG. 8, a block diagram of one embodiment of a user device 106 is shown. As discussed above, the user device 106 can be configured to provide information to and/or receive information from other components of the network-based intervention system 100. The user device can access the network-based intervention system 100 through any desired means or technology, including, for example, a webpage such as, for example, a social network service page, or a web portal. As depicted in FIG. 8, the user device 106 can include a network interface 800. The network interface 800 allows the user device 106 to access the other components of the network-based intervention system 100, and specifically allows the user device 106 to access the network 110 of the network-based intervention system 100. The network interface 800 can include features configured to send and receive information, including, for example, an antenna, a modem, a transmitter, receiver, or any other feature that can send and receive information. The network interface 120 can communicate via telephone, cable, fiber-optic, or any other wired communication network. In some embodiments, the network interface 800 can communicate via cellular networks, WLAN networks, or any other wireless network.

The user device 106 can include, for example, a typology engine 802. The typology engine 802 can identify and/or facilitate in identifying a user's typology. In some embodiments, for example, the typology engine 802 can cooperate with other components of the network-based intervention system 100 to identify and/or facilitate in identifying the typology of the user. In one embodiment, for example, the typology engine 802 can receive user data and typology data and evaluate the user data to determine the typology of the user.

The user device 106 can include an update engine 804. The update engine 804 can facilitate in updating any information within the network-based intervention system 100. In some embodiments, for example, the update engine 804 can facilitate a user such as, for example, a student in providing user data and/or outcome data, or a user such as, for example, a teacher providing course data. In some embodiments, the update engine 804 can be configured to update the user database 301 with information relating to the interactions between users of the network-based intervention system 100, including, for example, user relationships.

The user device 106 can include a user interface 806 that communicates information to, and receives inputs from, a user. The user interface 806 can include a screen, a speaker, a monitor, a keyboard, a microphone, a mouse, a touchpad, a keypad, a touchscreen, or any other feature or features that can receive inputs from a user and provide information to a user.

The user device 106 can include an outcome engine 808. The outcome engine 808 can be configured to receive outcome data from the outcome database 312 and determine the correlation between the outcome and the typology. In some embodiments, for example, this determination can include retrieving user data from the user database 301, determining a subset of users corresponding to the outcome, determining the degree to which the users in the subset of users achieve the outcome, determining the typology of the users within the subset of users, and correlating the typology to the outcome based on the degree to which the users achieve the outcome.

Figure 9:
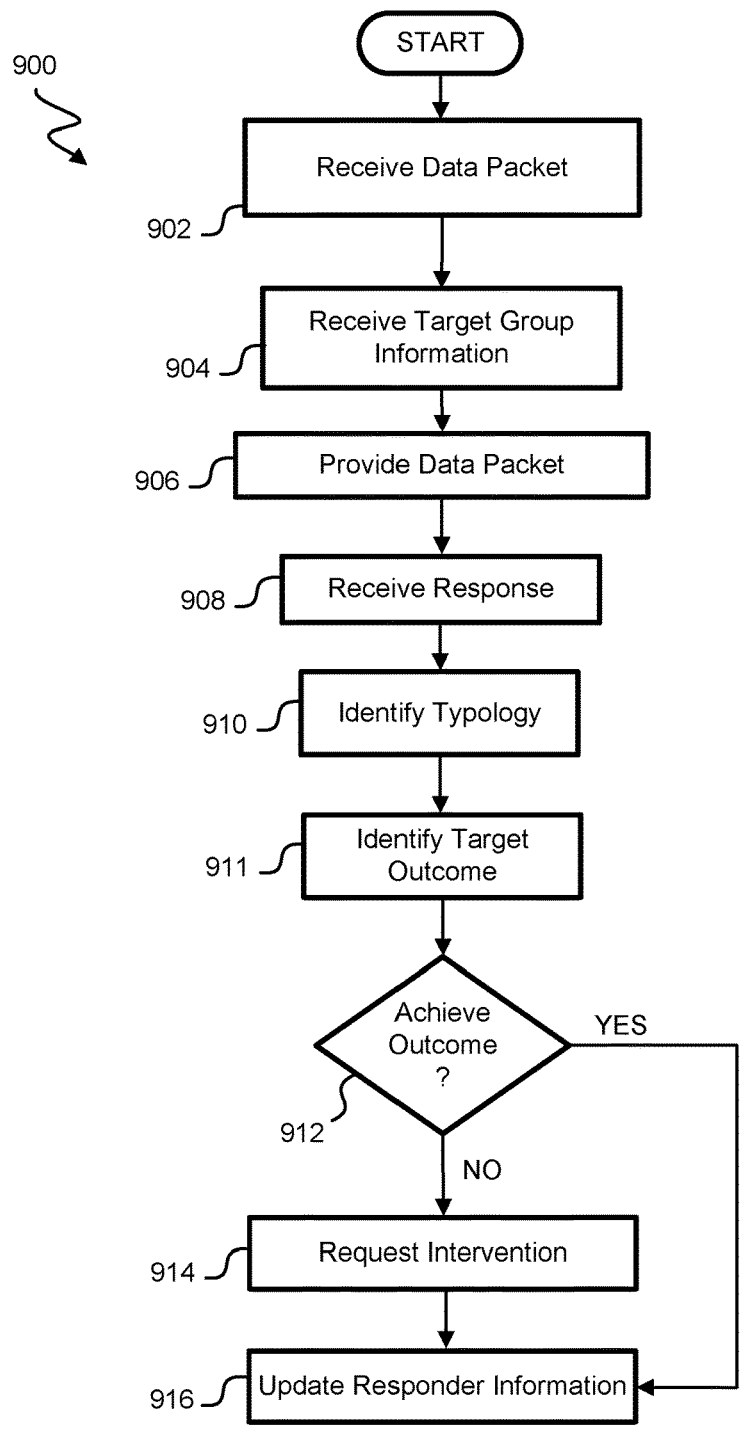
FIG. 9 is a flowchart illustrating one embodiment of a process for network based intervention.

With reference now to FIG. 9, a flowchart illustrating a process 900 for network-based intervention is provided, which network-based intervention can be network-based intervention. The process 900 can be performed by one or several of the components of the network-based intervention system 100. The process 900 begins at block 902 wherein a subject prompt, which can be a data packet, is received. In some embodiments, for example, the data packet can include data relating to a course of study. This data can include, for example, a question, a comment, or a quote. In some embodiments, for example, this prompt can be provided by a user such as a student and/or a teacher. This prompt can be received by the user device 106 including, for example, a student device, a teacher device and/or a supervisor device 110.

After the data packet has been received, the process 900 proceeds to block 904 wherein target group information is received. In some embodiments, for example, target group information can include information identifying the one or several designated recipient users of the data packet. In some embodiments, for example, the target group can comprise all, or a subset of, the users associated with a course of study such as, for example, the one or several students and/or teachers involved in the course of study. In some embodiments, for example, the target group information can be received from one or several of the databases 104 including, for example, the user database 301 and/or the course database 311. In some embodiments, the target group information can be received by a component of the network-based intervention system 100 such as, for example one or several of the user devices 106 and/or the processor 102.

After the target group information has been received, the process 900 proceeds to block 906 wherein the data packet is provided. In some embodiments, for example, the data packet received in block 902 can be stored in one or several of the databases 104 such as, for example, the user database 301 and/or the course database 311, and can be provided to one or several of the users via one or several of the user devices 106. In some embodiments, the data packet can be provided to the users in the target group.

After the data packet has been provided, the process 900 proceeds to block 908 wherein a response is received. The response can be any user-generated content, and in one embodiment, the response can be, for example, a reaction to the data packet. The response can be provided by a user that can be in the target group such as, for example, a student. The response can include, for example, a comment, question, a quote, a link, or any other data. In some embodiments, the response can be input into one or several of the user devices 106.

After the response has been received, the process 900 proceeds to block 910 wherein a typology is identified. In some embodiments, for example, the typology of the responding user can be identified. In some embodiments, for example, the identification of the responder's typology can include, for example, determining a characteristic of the responder's response such as, for example, the content of the response, the nature of the response, the style of the response, the timing of the response, and other user activities generated as a result of the response. In some embodiments, for example, the identification of the responder's typology can include, for example, determining one or several characteristics of the user, based on the user data. This can include, for example, analyzing past responder responses to determine the content of the past responses, nature of the past responses, the timing of the past responses, and/or other user activities generated as a result of the past responses. In some embodiments, for example, the identification of the responder's typology can include determining one or several characteristics of the responder based on other aspects of the responder's user data including, for example, past outcomes achieved by the responder, personality information of the responder, and/or any other information stored in the user data. The determined characteristics of the responder can be compared to typology criteria, and, based on the results of the comparison of the determined characteristics to the typology criteria, the user typology can be identified and/or the degree to which the user exhibits a typology can be identified.

After the responder's typology has been identified, the process 900 proceeds to block 911 wherein a target outcome is identified. In some embodiments, for example, an outcome can comprise a goal. This goal can include, for example, an academic task such as, for example, a test and/or a quiz, a goal for course of study, a goal for a grouping of courses of study, a career goal, a personal goal, and/or a lifetime goal. These goals can include, for example, a grade; a degree; a career; an acceptance to, for example, a university and/or educational program; receipt of an award; development of a personality characteristic and/or attribute; and educational goal, or a career goal. In some embodiments, for example, a target outcome can be a designated goal. In some embodiments, for example, the goal can be designated by the user such as, for example, by the student and/or teacher, and in some embodiments, for example, the goal can be a default goal. Thus, a user such as a student and/or teacher may select a target outcome based on his ambition, or a target outcome may be selected by default such as, for example, enrollment in a course of study can be associated with a target outcome of a passing grade.

After the target outcome has been identified, the process 900 proceeds to decision state 912 wherein it is determined if the user will likely achieve the target outcome. In some embodiments, for example, this determination can include the evaluation of the correlation between the typology and the target outcome. In some embodiments, for example, this determination can include the comparison of the correlation between the typology exhibited by the responder to an intervention criterion. In some embodiments, for example, the intervention criteria can comprise one or several values delineating between acceptable risk and unacceptable risk as to the likelihood of a responder achieving the target outcome. In some embodiments, the risk of failing to achieve the target outcome can be represented by a risk score that can indicate the strength of correlation between the determined typology and the target outcome. In some embodiments, for example, the intervention criteria can allow sorting of responders, based on risk, into groups designated for receiving an intervention and groups designated for not receiving an intervention. In some embodiments, for example, this determination can be made by a component of the network-based intervention system 100 such as, for example, the processor 102 and/or one or more of the user devices 106 or a component thereof such as, for example, typology engine 802 and/or the outcome engine 808.

If it is determined that the responder risk of achieving the target outcome is unacceptable, then the process 900 proceeds to block 914 wherein an intervention is requested. In some embodiments, for example, the intervention can include providing the responder with a notification of the risk relating to the target outcome, providing another user with a notification of the risk relating to the target outcome and identifying the responder, providing the responder and/or another user with the remedial plan for mitigating the risk associated with the target outcome, recommending additional and/or supplemental content, recommending a peer tutor and/or instructor, automatic assessment to determine state of knowledge, and/or any other desired action. In some embodiments, for example, the intervention can be requested by a component of the network-based intervention system 100 such as, for example, the processor 102 and/or one or more of the user devices 106 or components thereof.

After the intervention has been requested, and returning again to decision state 912, if it is determined that the risk of achieving the target outcome is acceptable, the process 900 proceeds to block 916 wherein the responder information is updated. In some embodiments, for example, the responder information can be updated in the user database 301. In some embodiments, this update can reflect the determination made in decision state 912, the responder typology identified in decision state 910, and the risk level associated with the typology and achieving the target outcome.

Figure 10:
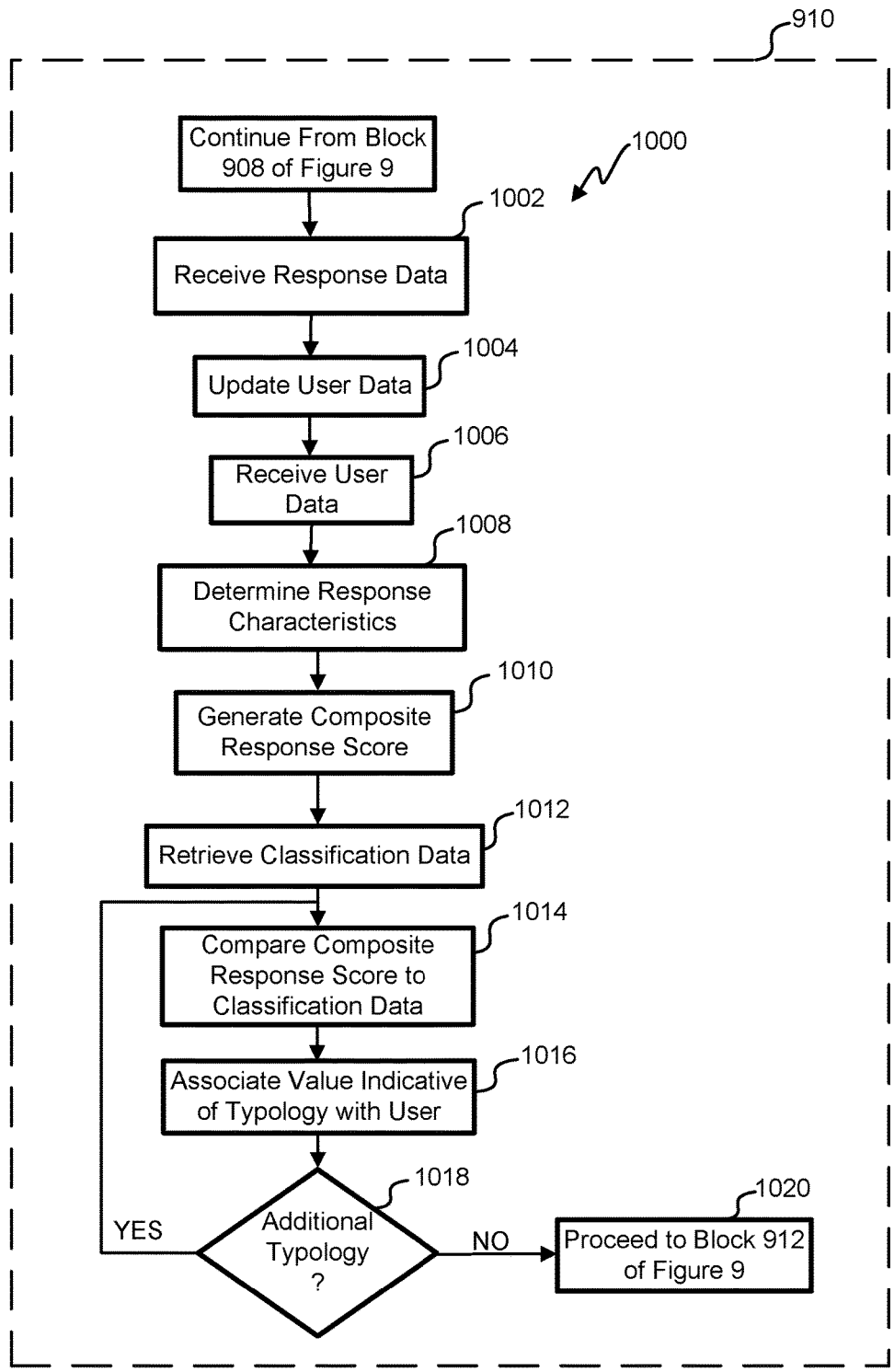
FIG. 10 is a flowchart illustrating one embodiment of a process for identifying a typology.

With reference now to FIG. 10, a flowchart illustrating one embodiment of a process 1000 for identifying a typology is shown. The process 1000 can be performed as part of step 910 as shown in FIG. 9. In some embodiments, the process 1000 can be performed by the network-based intervention system 100 and/or one or several components thereof.

The process 1000 begins at block 1002 wherein response data is received. In some embodiments, the response data can include a response received in block 908 of FIG. 9, and in some embodiments, the response data can include the received response as well as data relating to past responses. In some embodiments, the response data can be retrieved from one of the databases 104 such as, for example, the user database 301.

After the response data has been received, the process 1000 proceeds to block 1004 wherein user data is updated. In some embodiments, the user data can be updated with a value indicating that the response data has been received and/or retrieved. In some embodiments, this update can facilitate efficient evaluation of response data for one or several users. In some embodiments, the user data can be updated in one of the databases 104 such as, for example, the user database 301.

After the user data has been updated, the process 1000 proceeds to block 1006 wherein user data is received. In some embodiments, the user data can be received from one of the databases 104 such as, for example, the user database 301. After the user data has been the received, the process 1000 proceeds to block 1008 wherein response characteristics of the user are determined. In some embodiments, the determination of the response characteristics can comprise evaluating the response data. In some embodiments, this can include determining the time the response was made; the content of the response; the style, nature, and/or tone of the response; or the like. In some embodiments, the determination of the response characteristics can be performed with text mining software operating on either the processor 102 or one or several of the user devices 106.

After the response characteristics have been determined, the process 1000 proceeds to block 1010 wherein a composite response score is generated. In some embodiments, the composite response score can comprise one or several scores that identify characteristics of the response and/or of the user data. In some embodiments, a unique score can be assigned to each characteristic of the response and/or of the user data, and in some embodiments, the score can represent a conglomeration of multiple characteristics. In some embodiments, the score can indicate the presence of a characteristic such as, for example, a score generated according to a Boolean function wherein a first value is assigned if the response demonstrates the presence of the characteristic and wherein a second value is assigned if the response does not demonstrate the presence of the characteristic. In some embodiments, the score can indicate the degree to which a characteristic is present. In some embodiments, the composite response score can be generated by the processor 102 and/or one or several of the user devices.

After the composite response score has been generated, the process 1000 proceeds to block 1012 wherein classification data is retrieved. The classification data can comprise one or several parameters, equations, and/or values that can be used to identify a typology based on one or several response scores. In some embodiments, classification data can be stored in one of the databases 104 such as, for example, the typology database 313.

After the classification data has been retrieved, the process 1000 proceeds to block 1014 wherein the composite response score is compared to classification data. In some embodiments, the comparison of the composite response score to the classification data can include the use of the classification data to determine one or several user typologies based on the response data, the response score, and/or user data. The comparison of the response score to the classification data can be performed by the processor 102 and/or one or several of the user devices 106.

After the composite response score has been compared to the classification data, the process 1000 proceeds to block 1016 wherein a value indicative of the typology of the user is associated with the user data. In some embodiments in which one or several typologies have been identified, one or several values indicating the one or several typologies can be associated with the user data. In some embodiments, these values can indicate the presence of a typology such as, for example, a value generated according to a Boolean function wherein a first value is assigned if application of the classification data to the composite response score indicates the presence of the characteristic and wherein a second value is assigned if application of the classification data to the composite response score does not demonstrate the presence of the characteristic. In some embodiments, the score can indicate the degree to which a characteristic is present. In some embodiments, the value can be stored in one of the databases 104 such as, for example, the user database 301 and/or the typology database 313.

After a value indicative of the typology of the user has been associated with the user data, the process 1000 proceeds to decision state 1018 wherein it is determined if the response and user data should be evaluated for additional typologies. In some embodiments, this determination can include identifying all of the typologies for which user and/or response data is evaluated and determining whether the user and/or response data has been evaluated for indication of all of the identified typologies. If it is determined that additional evaluation of the user and/or response data is desired, then the process 1000 returns to block 1014 and proceeds as outlined above. If it is determined that additional evaluation is not desired, then the process 1000 proceeds to block 1020 and continues at block 912 of FIG. 9.

Figure 11:
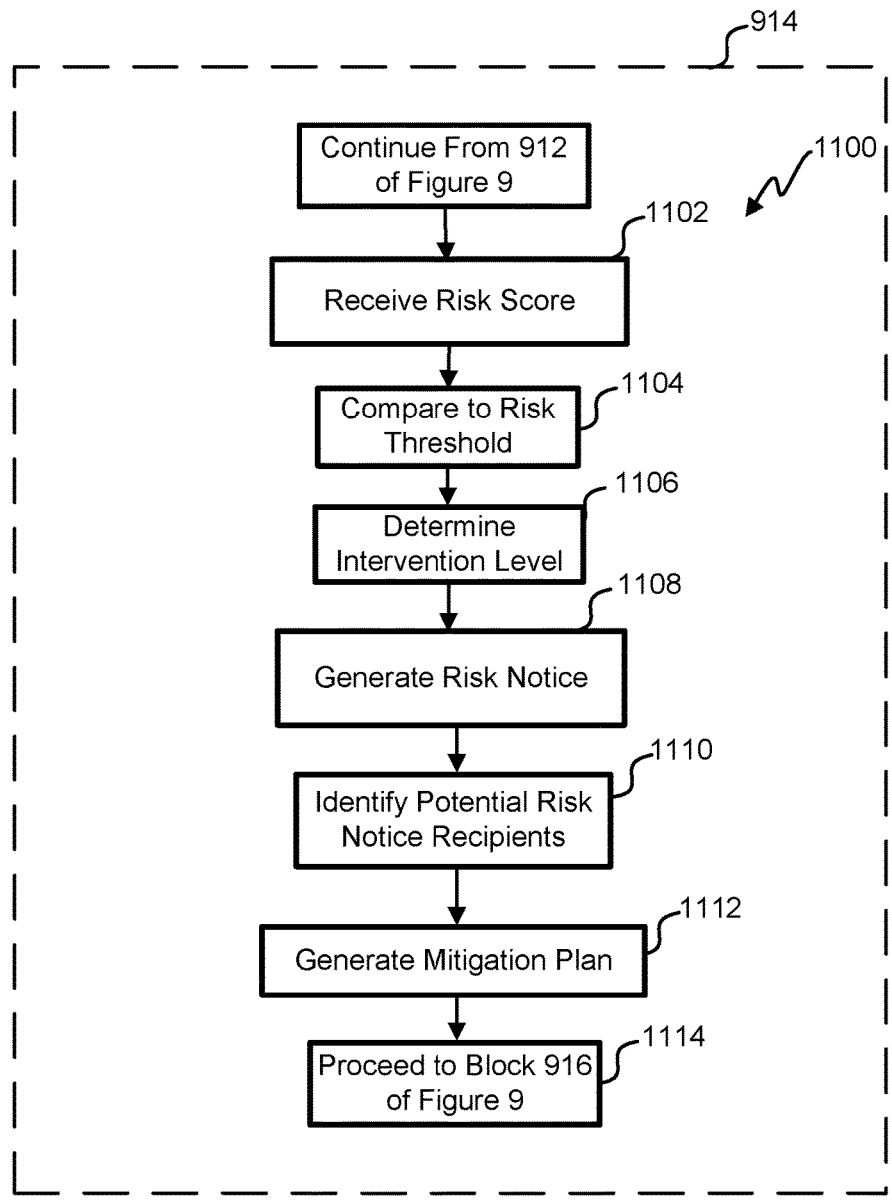
FIG. 11 is a flowchart illustrating one embodiment of a process for requesting intervention.

With reference now to FIG. 11, a flowchart illustrating one embodiment of a process 1100 for requesting intervention is shown. The process 1100 can be performed as part of step 914 shown in FIG. 9. In some embodiments, the process 1100 can be performed by the network-based intervention system 100 and/or one or several components thereof.

The process begins at block 1102 wherein the risk score is received. In some embodiments, the risk score can represent the risk of failing to achieve the target outcome and can indicate the strength of correlation between the determined typology and the target outcome. In some embodiments, the risk score can be determined by the processor 102 and/or another component of the network-based intervention system 100. In some embodiments, the risk score can be determined as part of decision state 912 shown in FIG. 9.

In some embodiments, the receipt of the risk score can further include receiving a risk threshold. In some embodiments, the risk threshold can define an upper limit for acceptable risk levels, and specifically, an upper limit for likelihood of failure to achieve the target outcome. The risk threshold can be any desired value and can, in some embodiments, vary, based on the target outcome. In some embodiments, the risk threshold can be specified by the user and the risk threshold can be stored in one of the databases 104 such as, for example, the user database 301 and/or the outcome database 312.

After the risk score has been received, the process 1100 proceeds to block 1104 wherein the risk score is compared to the risk threshold. In some embodiments, this can include determining whether the risk score meets, exceeds, or fails to meet the risk threshold. In some embodiments, a value is associated with the risk score based on whether it meets, exceeds, or fails to meet the risk threshold. In one such embodiment, a first value indicative of an acceptable risk level is associated with the risk score when the risk score fails to meet or fails to exceed the risk threshold, and a second value indicative of an unacceptable risk level is associated with the risk score when the risk score meets or exceeds the risk threshold. In some embodiments, the comparison of the risk score to the risk threshold can be performed by the processor 102 or other component of the network-based intervention system 100.

In embodiments in which the risk score exceeds the risk threshold, the comparison of the risk score to the risk threshold can include determining the degree to which the risk score exceeds the risk threshold. In some embodiments, this can be performed by comparing the risk score to a plurality of higher risk thresholds and determining which of the higher risk thresholds have been met and/or exceeded. In some embodiments, a value indicative of the degree to which the risk score exceeds the risk threshold can be associated with the user and/or the user data. In some embodiments, this determination of the degree to which the risk score exceeds the risk threshold can be performed by the processor 102 and/or another component of the network-based intervention system 100.

After the risk score has been compared to the risk threshold, the process 1100 proceeds to block 1106 wherein an intervention level is determined. In some embodiments this determination of the intervention level can include retrieving information indicating the degree to which the risk score exceeds the risk threshold. In one embodiment, for example, each of the higher risk thresholds discussed above can be associated with a different intervention level. In one such embodiment, the intervention level associated with the highest risk threshold that is met and/or exceeded can be identified as appropriate for the student/user.

Advantageously, in some embodiments, as the risk of failing to achieve the target outcome increases, the level of intervention can increase to thereby mitigate the increasing risk. In one exemplary embodiment, for example, when the risk score exceeds the risk threshold to a lesser degree, a first intervention level can be attained whereas in another exemplary embodiment in which the risk score exceeds the risk threshold to a greater degree a second intervention level can be attained, and in one exemplary embodiment in which the risk score exceeds the risk threshold to an even greater degree, a third intervention level can be attained. In some embodiments, there can be any desired number of intervention levels and the intervention levels can be triggered in any desired fashion. In some embodiments, information relating to the different intervention levels can be stored in one of the databases 104 such as, for example, the course database 311 and/or the outcome database 312.

After the intervention level has been determined, the process 1100 proceeds to block 1108 wherein a risk notice is generated. In some embodiments, the risk notice can comprise a message corresponding to the determined intervention level. In some embodiments, the risk notice can serve to notify the recipient of the risk of failing to achieve the target outcome, and in some embodiments, the risk notice can include one or several remedial and/or risk mitigating steps or actions. The risk notice can be generated by the processor 102 with information retrieved from, for example, the outcome database 312 and/or the course database 311.

After the risk notice has been generated, the process 1100 proceeds to block 1110 wherein potential risk notice recipients are identified. In some embodiments, the identification of potential risk notice recipients can be performed by the processor 102 with data stored in one of the databases 104 such as, for example, the user database 301, the course database 311, and/or the outcome database 312.

After the potential risk notice recipients have been identified, the process 1100 proceeds to block 1112 wherein a mitigation plan is generated. In some embodiments, the mitigation plan can correspond to the identified intervention level. Thus, in some embodiments in which the first intervention level is attained, the prescribed mitigation plan may involve notifying the user/student of the risk of failure; in another exemplary embodiment in which the second intervention level is attained, the prescribed mitigation plan may involve notifying the user/student and a teacher/trainer/parent/mentor or other individual of the risk of failure; and in a third exemplary embodiment in which the third intervention level is attained, the prescribed mitigation plan may involve one or several recommended courses, materials, or actions to affect the typology of the user to thereby decrease the user's risk of failing to achieve the target outcome in addition to notifying the user/student and/or a teacher/trainer/parent/mentor or other individual of the risk of failure to achieve the target outcome. In some embodiments, information relating to the different mitigation plans is stored in one of the databases 104 such as, for example, the course database 311 and/or the outcome database 312. After the mitigation plan has been generated, the process 1100 proceeds to block 1114 and continues at block 916 of FIG. 9.

Figure 12:
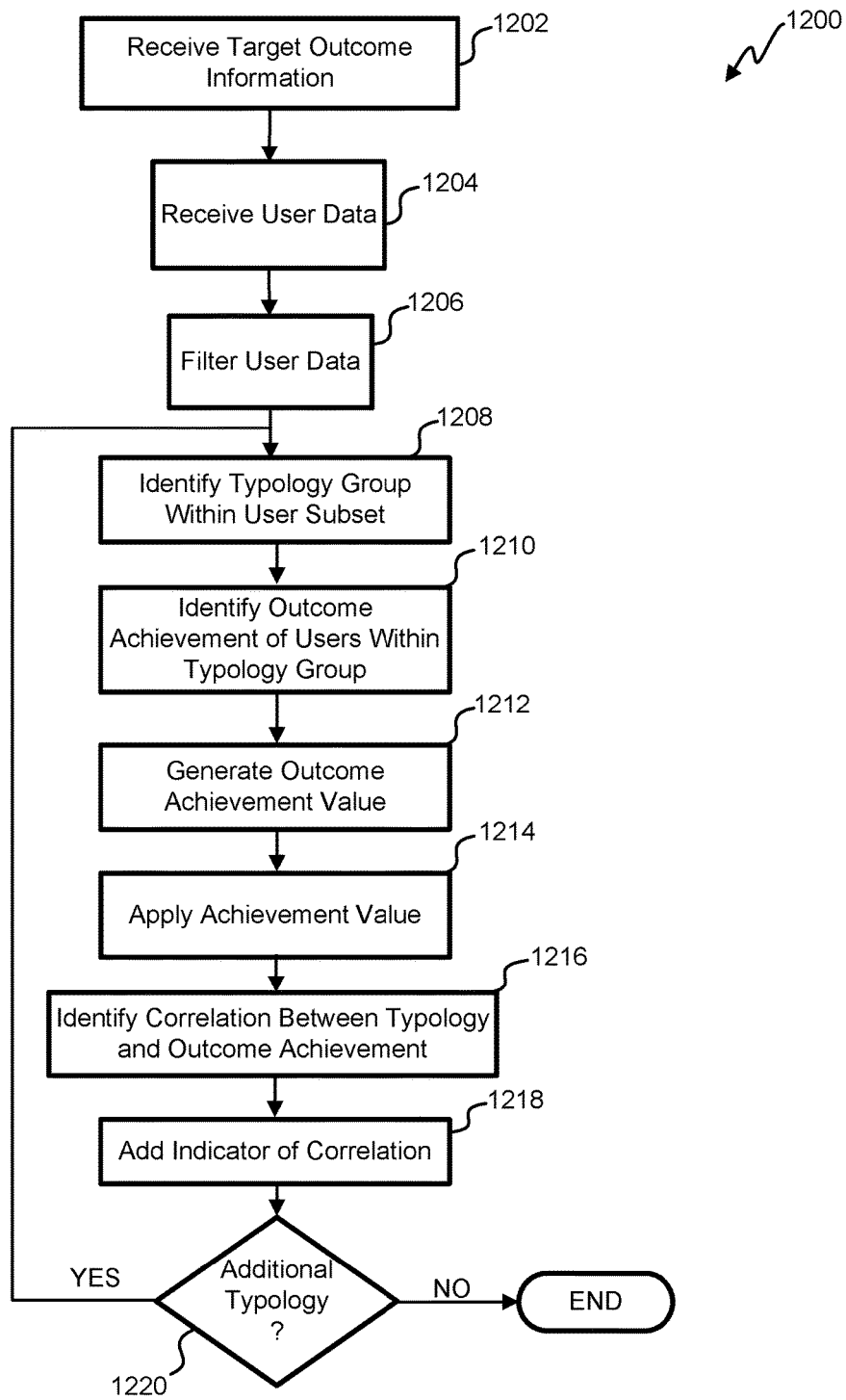
FIG. 12 is a flowchart illustrating one embodiment of a process for linking a target outcome to a typology.

With reference now to FIG. 12, a flowchart illustrating one embodiment of a process 1200 for linking a target outcome to a typology is provided. The process 1200 can be performed by the network-based intervention system 100 and/or components thereof. The process 1200 begins at block 1202 wherein target outcome information is received. In some embodiments, for example, the target outcome information can include the identification of a goal, and can be received, for example, from one or several users via one or several user devices 106 and/or from one of the databases 104 such as, for example, the user database 301 and/or the outcome database 312.

After the target outcome information has been received, the process 1200 proceeds to block 1204 wherein the user data is received. In some embodiments, and as discussed above in greater detail, the user data can include information relating to one or several users. This information can be received, for example, from one or several users via one or several user devices 106 and/or from the user database 301.

After the user data has been received, the process 1200 proceeds to block 1206 wherein the user data is filtered. In some embodiments, for example, the user data can be filtered to divide the user data into a first group, or user subset, related to the target outcome and the second group that is unrelated to target outcome. In some embodiments, for example, the first group that is related to the target outcome can be related to the target outcome in that members of the first group have, to some degree, achieved the target outcome and/or have taken steps towards achieving the target outcome. This filtering can be performed, for example, by a component of the network-based intervention system 100 such as, for example, the processor 102 and/or one or several of the user devices 106 or components thereof including, for example, the outcome engine 808.

After the user data has been filtered, the process 1200 proceeds to block 1208 wherein a typology group within the user subset is identified. In some embodiments, for example, the typology group within the user subset can comprise a group of users within the subset of users related to the target outcome that exhibits a typology and/or exhibits at least a certain degree of the typology. In some embodiments, for example, this identification can include first analyzing user data associated with individual users to determine the typology and/or typologies of the individual users, and then identifying typology groupings of users. This identification can be performed, for example, by the processor 102 and/by or one or several of the user devices 106 or components thereof.

After the typology group within the user subset has been identified, the process 1200 proceeds to block 1210 wherein the outcome achievement of the users within the typology group is identified. In some embodiments, for example, this can include the binary determination of whether the users within the typology have achieved the outcome, or non-binary determination of the degree to which the users within the typology group have achieved the outcome. The identification of the outcome achievement of the users can be performed by, for example, processor 102 and/or one or several of the user devices 106 or components thereof.

After the outcome achievement of users within the typology group has been identified, the process 1200 proceeds to block 1212 wherein an outcome achievement value is generated. In some embodiments, for example, the outcome achievement value can indicate whether the user achieved the target outcome and/or indicate the degree to which the user has achieved the target outcome. In some embodiments, the achievement value can be generated according to a Boolean function, wherein a first value is generated if the target outcome is achieved, and a second value is generated if the target outcome is not achieved. In some embodiments, the achievement value can be generated by, for example, the processor 102 and/or one or several of the user devices 106 or components thereof.

After the outcome achievement value has been generated, the process 1200 proceeds to block 1214 wherein the achievement value is applied. In some embodiments, for example, the outcome achievement value can be applied to the user from whose user data the outcome achievement value was generated. In some embodiments, the application of the achievement value can include the storing of the achievement value in one of the databases 106 such as user database 301 and or the outcome database 312.

After the achievement value has been applied, the process 1200 proceeds to block 1216 wherein the correlation between the typology and outcome achievement is identified. This correlation between the typology and outcome achievement can comprise correlative evidence and/or other evidence of an inferred relationship. In some embodiments, the generation of the correlation can include use of a statistical method of evaluation and/or a stochastic process, and in some embodiments, this may include other measures of causality including, for example, one or several discrete probabilities that can be derived through other techniques such as, for example, information-theoretic mechanisms. In some embodiments, for example, this can include the generating of correlation value for the users within the typology group. In some embodiments, for example, this can include generating a correlation value for the entire typology group and/or the correlation value for one or several portions of the typology group. In some embodiments, for example, it may be advantageous to generate a correlation value for a subset of the typology group exhibiting a certain degree and/or a range of degrees of the typology. In some embodiments, the correlation value can be generated by a component of the network-based intervention system 100 such as the processor 102 and/or one or several of the user devices 106 or components thereof.

After the correlation between the typology and outcome achievement is identified, the process 1200 proceeds to block 1218 wherein an indication of the correlation is added. In some embodiments, for example, an indication of the correlation can be added to one or more of the databases 104 such as, for example, the outcome database 312 and/or the typology database 313.

After an indicator of the correlation is added, the process 1200 proceeds to decision state 1220 wherein it is determined if there is an additional typology represented in the filtered user data. In some embodiments, for example, the filtered user data can include users having multiple typologies and/or exhibiting degrees of multiple typologies. In some embodiments, for example, it may be advantageous to determine the correlation between outcome achievement and one, some, or all of the typologies exhibited within the filtered user data. Thus, it can be advantageous to perform the steps outlined in blocks 1208 to 1218 for multiple typologies contained within the filtered user data.

In some embodiments, for example, the determination of whether there is an additional typology represented in the filtered user data can include evaluating the filtered user data for indications of the additional typologies. This can be performed by, for example, the processor 102 and/or one or several of the user devices 106 or components thereof. If it is determined that there are additional typologies exhibited within the filtered user data, the process 1200 returns to block 1208. If it is determined that there are no additional typologies within the filtered user data, then the process can, for example, terminate.

Figure 13:
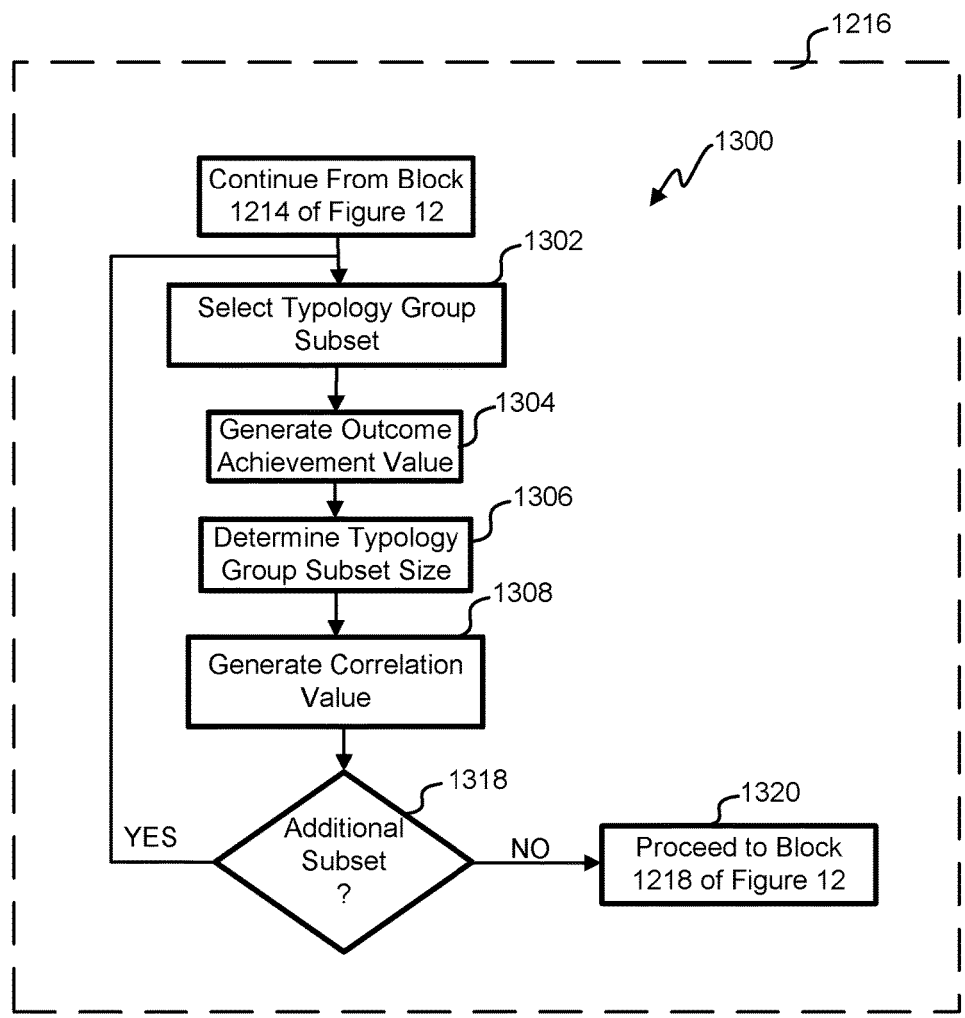
FIG. 13 is a flowchart illustrating one embodiment of a process for identifying a correlation between typology and outcome achievement.

With reference now to FIG. 13, a flowchart illustrating one embodiment of a process 1300 for identifying a correlation between typology and outcome achievement is shown. The process 1300 can be performed as part of step 1216 as shown in FIG. 12. In some embodiments, the process 1300 can be performed by the network-based intervention system 100 and/or one or several components thereof.

The process 1300 begins at block 1302 wherein a typology group subset is selected. In some embodiments, the typology group subset can be all or a portion of the users identified within the typology group. In some embodiments, the typology group subset can be users exhibiting one or several desired typologies and/or one or several desired degrees of one or several desired typologies. In some embodiments, the typology group subset can be the same as the typology group identified in block 1208 of FIG. 12, and in some embodiments, the typology group subset can be different from the typology group identified in block 1208 of FIG. 12. In embodiments in which the typology group subset is different in the typology group identified in block 1208 of FIG. 12, the typology group subset can comprise users having a desired composition of multiple typologies. In some embodiments, the typology group subset can be identified based on user data received from, for example, the user database 301 and this identification can be performed by the processor 102 and/or another component of the network-based intervention system 100.

After the typology group subset has been identified, the process 1300 proceeds to block 1304 wherein an outcome achievement value is identified. In some embodiments, the outcome achievement value can indicate whether some or all of the users within the typology group subset have attained and/or are attaining the target outcome and/or the degree to which some or all of the users within the typology group subset have attained and/or are attaining the target outcome. In some embodiments, the outcome achievement value can be generated by the processor 102 and/or another component of the network-based intervention system 100.

After the outcome achievement value has been generated, the process 1300 proceeds to block 1306 wherein the typology group subset size is determined. In some embodiments, this can include determining the number of users within the typology group subset. This determination can be made by the processor 102 or another component of the network-based intervention system 100 such as, for example, one or several of the user devices 106. After the typology group subset size has been determined, the process 1300 proceeds to block 1308 wherein a correlation value is generated. In some embodiments, the correlation value can indicate the correlation between the one or several typologies expressed in the typology group subset and achievement of the target outcome. In some embodiments, the correlation value can be calculated using any desired statistical or stochastic method and can be calculated by the processor 102 or other component of the network-based intervention system 100.

After the correlation value has been generated, the process 1300 proceeds to decision state 1318 wherein it is determined if there is an additional typology group subset to be evaluated. In some embodiments, this can include determining whether all of a group of desired typologies have been evaluated to generate a correlation value for those desired typologies. If one of the group of desired typologies has not been evaluated to generate a correlation value, then the process 1300 returns to block 1302 and proceeds as outlined above. If it is determined that no additional typologies should be evaluated to generate a correlation value, then the process 1300 proceeds to block 1320 and returns to block 1218 of FIG. 12.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for network-based intervention comprising:
storing, in an electronic database:
　a target group data, wherein the target group data identifies a target group comprising intended recipients of an electronic data packet; and
　a member data identifying attributes of a member of the target group, wherein the attributes include information relating to:
　　the member's past responses, and
　　data relating to the member's past outcomes;
displaying, within a first user interface of a client software running on a first user device coupled to the computer network, a question prompt contained within the electronic data packet;
receiving, using the user interface, a user input comprising a response to the prompt;
receiving at a server, comprising a computing device coupled to the computer network and including at least one processor executing within memory instructions, the electronic data packet, wherein the electronic data packet comprises data relating to a topic;
receiving at the server, responsive to the instructions executing a first query of the electronic database, the target group data;
receiving at the server the response from the member of the target group by transmission through the computer network of the user input received from the user interface displayed on the first user device, wherein the response is related to the electronic data packet transmitted through the computer network;
automatically analyzing at the server the response, using a text mining software running on the server, to identify at least one response characteristic;
identifying at the server a typology of the member, wherein the typology identifies a classification according to one or several academic and non-academic characteristics of the member and the response, wherein the typology is identified according to a unique composite response score based on at least one characteristic score associated with:
　the member data received responsive to the second query of the electronic database,
　personality information stored in the electronic database,
　the at least one response characteristic automatically identified by the text mining software within the response, and
　user activity generated as a result of the response and the at least one previous response;
identifying at the server a member outcome, wherein the member outcome is an identified goal;
determining an intervention level based at least in part on a risk score that is indicative of a risk that the member fails to achieve the member outcome;
automatically providing an intervention request to the user device from the server via the computer network when the identified typology does not positively correlate to achievement of the member outcome and when the determined intervention level corresponds to the risk score satisfying a first threshold; and
responsive to a determination that the intervention level corresponds to the risk score satisfying a second threshold, automatically generating a second user interface which, after transmission through the computer network to a second user device, automatically displays an alert on the second user device comprising an intervention request including the intervention.

2. The method of claim 1, wherein the typology of the member identifies a trait of the member, and wherein identifying the typology of the member comprises determining a characteristic of the response.

3. The method of claim 2, wherein the identifying the typology of the member comprises automatically generating a composite response score, wherein the composite response score is one or several values indicative of one or several attributes of the response.

4. The method of claim 3, wherein the attributes of the response comprise at least one of:
    response content;
    a response style; and/or
    a response timing.

5. The method of claim 3, wherein the identifying the typology of the member comprises retrieving classification data, wherein the classification data correlates one or several composite response scores with one or several typologies, and comparing the response score to the classification data to determine the typology of the member.

6. The method of claim 1, wherein the determining whether the identified typology positively correlates to achievement of the member outcome comprises calculating the risk score indicative of the risk that the member fails to achieve the member outcome.

7. The method of claim 6, comprising comparing the risk score to a risk threshold.

8. The method of claim 7, further comprising generating a mitigation plan comprising steps to increase a likelihood of member attainment of the member outcome.

9. The method of claim 1, further comprising determining whether the identified typology positively correlates to achievement of the member outcome.

10. A system for social network-based intervention, the system comprising:
    an electronic database comprising:
        a target group data, wherein the target group data identifies a target group comprising intended recipients of an electronic data packet; and
        a member data identifying attributes of a member of the target group, wherein the attributes include information relating to:
            the member's past responses, and
            data relating to the member's past outcomes;
    a first user device coupled to a computer network and configured to:
        display, within a first user interface of a client software running on the first user device, a question prompt contained within the electronic data packet; and
        receive, using the user interface, a user input comprising a response to the prompt;
    a server comprising a computing device coupled to the computer network and including a processor executing within the memory instructions which, when executed, cause the system to:
        receive, by transmission through the computer network, the electronic data packet, wherein the electronic data packet comprises information relating to a topic;
        receive, responsive to the instructions executing a first query of the electronic database, the target group data;
        receive the response from the member of the target group by transmission through the computer network of the user input received from the user interface displayed on the first user device, wherein the response is related to the electronic data packet transmitted through the computer network;
        receive, responsive to the instructions executing a second query of the electronic database, the member data;
        automatically analyze the response, using a text mining software running on the server, to identify at least one response characteristic;
        identify a typology of the member, wherein the typology identifies a classification according to one or several academic and non-academic characteristics of the member and the response, wherein the typology is identified according to a unique composite response score based on at least one characteristic score associated with:
            the member data received responsive to the second query of the electronic database,
            personality information stored in the electronic database,
            the at least one response characteristic automatically identified by the text mining software within the response, and
            user activity generated as a result of the response and the member's past responses;
        identify a member outcome, wherein the member outcome is an identified goal, wherein the goal is a non-academic goal;
        determine whether the identified typology positively correlates to achievement of the member outcome;
        determine an intervention level based at least in part on a risk score that is indicative of a risk that the member fails to achieve the member outcome;
        request an intervention when the identified typology does not positively correlate to achievement of the member outcome and when the determined intervention level corresponds to the risk score satisfying a first threshold; and
        responsive to a determination that the intervention level corresponds to the risk score satisfying a second threshold, automatically generate a second user interface which, after transmission through the computer network to a second user device, automatically displays an alert on the second user device comprising an intervention request including the intervention.

11. The system of claim 10, wherein the processor is further configured to provide the electronic data packet to the target group.

12. The system of claim 11, wherein the typology of the member identifies a trait of the member, and wherein the identifying the typology of the member comprises determining a characteristic of the received response.

13. The system of claim 12, wherein the identifying the typology of the member comprises generating a composite response score, wherein the composite response score is one or several values indicative of one or several attributes of the response.

14. The system method of claim 13, wherein the attributes of the response comprise at least one of:
    response content;
    a response style; and/or
    a response timing.

15. The system of claim 13, wherein the identifying the typology of the member comprises retrieving classification data, wherein the classification data correlates one or several composite response scores with one or several typologies, and comparing the response score to the classification data to determine the typology of the member.

16. The system of claim 10, wherein the determining whether the identified typology positively correlates to achievement of the member outcome comprises calculating the risk score indicative of the risk that the member fails to achieve the member outcome.

17. The system method of claim 16, further comprising generating a mitigation plan comprising steps to increase a likelihood of member attainment of the member outcome.

* * * * *